United States Patent
Baronne et al.

(10) Patent No.: US 12,481,537 B2
(45) Date of Patent: Nov. 25, 2025

(54) METHODS AND SYSTEMS FOR COMMUNICATIONS BETWEEN HARDWARE COMPONENTS

(71) Applicant: Micron Technology, Inc., Boise, ID (US)

(72) Inventors: Christopher Baronne, Allen, TX (US); Michael Keith Dugan, Richardson, TX (US); Bryan Hornung, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 695 days.

(21) Appl. No.: 17/813,763

(22) Filed: Jul. 20, 2022

(65) Prior Publication Data

US 2024/0028390 A1    Jan. 25, 2024

(51) Int. Cl.
*G06F 9/50*    (2006.01)
*G06F 9/48*    (2006.01)
(Continued)

(52) U.S. Cl.
CPC ............ *G06F 9/505* (2013.01); *G06F 9/4881* (2013.01); *G06F 9/546* (2013.01); *G06F 9/5083* (2013.01);
(Continued)

(58) Field of Classification Search
None
See application file for complete search history.

(56) References Cited

U.S. PATENT DOCUMENTS

| 8,122,229 | B2 | 2/2012 | Wallach et al. |
| 8,156,307 | B2 | 4/2012 | Wallach et al. |

(Continued)

FOREIGN PATENT DOCUMENTS

| CN | 117435545 | 1/2024 |
| CN | 117435549 | 1/2024 |

(Continued)

OTHER PUBLICATIONS

"U.S. Appl. No. 17/813,780, Non Final Office Action mailed Apr. 23, 2024", 11 pages.

(Continued)

*Primary Examiner* — Qing Yuan Wu
(74) *Attorney, Agent, or Firm* — Schwegman Lundberg & Woessner, P.A.

(57) ABSTRACT

Various examples are directed to an arrangement comprising a first hardware compute element and a hardware balancer element. The first hardware compute element may send a first request message to a hardware balancer element. The first request message may describe a processing task. The hardware balancer element may send a second request message towards a second hardware compute element for executing the processing task and send to the first compute element a first reply message in reply to the first request message. After sending the first reply message, the hardware balancer element may receive a first completion request message indicating that the processing task is assigned and send, to the first hardware computing element, a second completion request message, the second completion request message indicating that the processing task is assigned.

20 Claims, 17 Drawing Sheets

(51) Int. Cl.
*G06F 9/54* (2006.01)
*G06F 15/78* (2006.01)

(52) U.S. Cl.
CPC ...... *G06F 15/7821* (2013.01); *G06F 15/7825* (2013.01)

(56) References Cited

U.S. PATENT DOCUMENTS

| | | | |
|---|---|---|---|
| 8,205,066 | B2 | 6/2012 | Brewer et al. |
| 8,423,745 | B1 | 4/2013 | Brewer |
| 8,561,037 | B2 | 10/2013 | Brewer et al. |
| 9,710,384 | B2 | 7/2017 | Wallach et al. |
| 10,990,391 | B2 | 4/2021 | Brewer |
| 10,990,392 | B2 | 4/2021 | Brewer |
| 2008/0270708 | A1 | 10/2008 | Warner et al. |
| 2010/0036956 | A1* | 2/2010 | Nishikawa ............. G06F 9/505 718/105 |
| 2012/0079177 | A1 | 3/2012 | Brewer et al. |
| 2013/0332711 | A1 | 12/2013 | Leidel et al. |
| 2014/0025920 | A1 | 1/2014 | Stark et al. |
| 2015/0143350 | A1 | 5/2015 | Brewer |
| 2015/0206561 | A1 | 7/2015 | Brewer et al. |
| 2018/0173564 | A1* | 6/2018 | Chen ...................... G06F 9/505 |
| 2019/0042214 | A1 | 2/2019 | Brewer |
| 2019/0171604 | A1 | 6/2019 | Brewer |
| 2019/0243700 | A1 | 8/2019 | Brewer |
| 2019/0303154 | A1 | 10/2019 | Brewer |
| 2019/0324928 | A1 | 10/2019 | Brewer |
| 2019/0340019 | A1 | 11/2019 | Brewer |
| 2019/0340020 | A1 | 11/2019 | Brewer |
| 2019/0340023 | A1 | 11/2019 | Brewer |
| 2019/0340024 | A1 | 11/2019 | Brewer |
| 2019/0340027 | A1 | 11/2019 | Brewer |
| 2019/0340035 | A1 | 11/2019 | Brewer |
| 2019/0340154 | A1 | 11/2019 | Brewer |
| 2019/0340155 | A1 | 11/2019 | Brewer |
| 2021/0055964 | A1 | 2/2021 | Brewer |
| 2021/0064374 | A1 | 3/2021 | Brewer |
| 2021/0064435 | A1 | 3/2021 | Brewer |
| 2021/0149600 | A1 | 5/2021 | Brewer |
| 2024/0028526 | A1 | 1/2024 | Baronne et al. |

FOREIGN PATENT DOCUMENTS

| | | |
|---|---|---|
| WO | 2010051167 | 5/2010 |
| WO | 2013184380 | 12/2013 |
| WO | 2019191740 | 10/2019 |
| WO | 2019191742 | 10/2019 |
| WO | 2019191744 | 10/2019 |
| WO | 2019217287 | 11/2019 |
| WO | 2019217295 | 11/2019 |
| WO | 2019217324 | 11/2019 |
| WO | 2019217326 | 11/2019 |
| WO | 2019217329 | 11/2019 |
| WO | 2019089816 | 4/2020 |

OTHER PUBLICATIONS

"U.S. Appl. No. 17/813,780, Response filed Jul. 23, 2024 to Non Final Office Action mailed Apr. 23, 2024", 8 pages.
"U.S. Appl. No. 17/813,780, Notice of Allowance mailed Aug. 28, 2024", 7 pages.

* cited by examiner

METHODS AND SYSTEMS FOR COMMUNICATIONS BETWEEN HARDWARE COMPONENTS

STATEMENT REGARDING FEDERALLY SPONSORED RESEARCH OR DEVELOPMENT

This invention was made with government support under DE-NA0003525 awarded by the United States Department of Energy. The government has certain rights in the invention.

BACKGROUND

Various computer architectures, such as the Von Neumann architecture, conventionally use a shared memory for data, a bus for accessing the shared memory, an arithmetic unit, and a program control unit. However, moving data between processors and memory can require significant time and energy, which in turn can constrain performance and capacity of computer systems. In view of these limitations, new computing architectures and devices are desired to advance computing performance beyond the practice of transistor scaling (i.e., Moore's Law).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
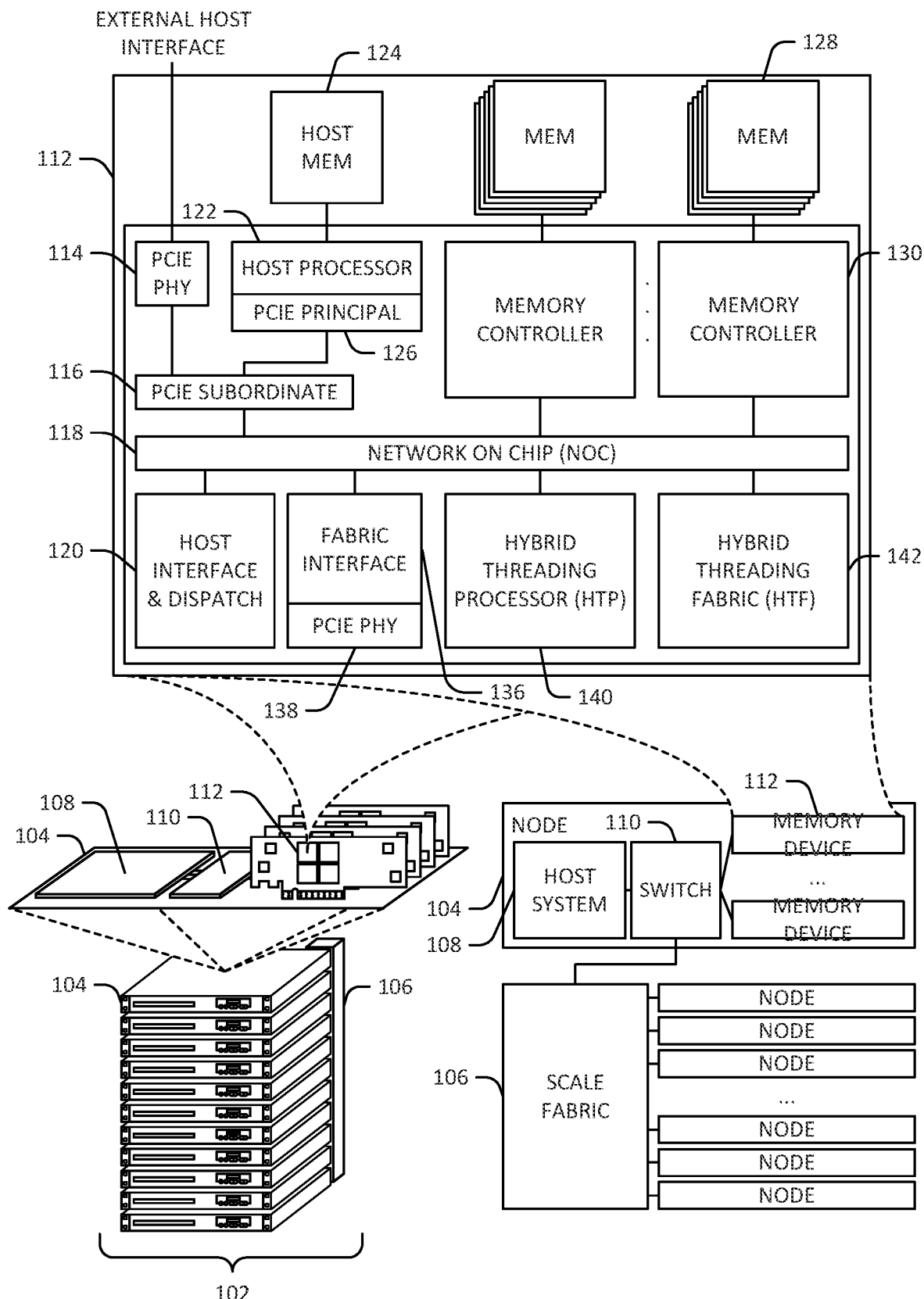
FIG. 1 illustrates generally a first example of a first memory-compute device in the context of a memory-compute system, according to an embodiment.

Recent advances in materials, devices, and integration technology can be leveraged to provide memory-centric compute topologies. Such topologies can realize advances in compute efficiency and workload throughput, for example, for applications constrained by size, weight, or power requirements. The topologies can be used to facilitate low-latency compute near, or inside of, memory or other data storage elements. The approaches can be particularly well-suited for various compute-intensive operations with sparse lookups, such as in transform computations (e.g., fast Fourier transform computations (FFT)), or in applications such as neural networks or artificial intelligence (AI), financial analytics, or simulations or modeling such as for computational fluid dynamics (CFD), Enhanced Acoustic Simulator for Engineers (EASE), Simulation Program with Integrated Circuit Emphasis (SPICE), and others.

Systems, devices, and methods discussed herein can include or use memory-compute systems with processors, or processing capabilities, that are provided in, near, or integrated with memory or data storage components. Such systems are referred to generally herein as compute-near-memory (CNM) systems. A CNM system can be a node-based system with individual nodes in the systems coupled using a system scale fabric. Each node can include or use specialized or general purpose processors, and user-accessible accelerators, with a custom compute fabric to facilitate intensive operations, particularly in environments where high cache miss rates are expected.

In an example, each node in a CNM system can have a host processor or processors. Within each node, a dedicated hybrid threading processor can occupy a discrete endpoint of an on-chip network. The hybrid threading processor can have access to some or all of the memory in a particular node of the system, or a hybrid threading processor can have access to memories across a network of multiple nodes via the system scale fabric. The custom compute fabric, or hybrid threading fabric, at each node can have its own processor(s) or accelerator(s) and can operate at higher bandwidth than the hybrid threading processor. Different nodes in a compute-near-memory system can be differently configured, such as having different compute capabilities, different types of memories, different interfaces, or other differences. However, the nodes can be commonly coupled to share data and compute resources within a defined address space.

In an example, a CNM system, or a node within the system, can be user-configured for custom operations. A user can provide instructions using a high-level programming language, such as C/C++, that can be compiled and mapped directly into a dataflow architecture of the system, or of one or more nodes in the CNM system. That is, the nodes in the system can include hardware blocks (e.g., memory controllers, atomic units, other customer accelerators, etc.) that can be configured to directly implement or support user instructions to thereby enhance system performance and reduce latency.

In an example, a CNM system may include various network structures connecting hardware compute elements. For example, the system scale fabric may be a network structure connecting the different nodes, where a node includes various compute elements. Within a node, a switch arrangement or fabric may be a network structure connecting a host system and/or various memory devices where the host system and/or memory devices can be compute elements. In an example, components of nodes, host systems, and/or memory devices may include a Network on a Chip (NOC) that acts as a network structure for various components on the respective chips.

To handle a communication request between compute elements, a network structure may selectively provide one or more data paths, referred to herein as busses, between the compute elements that are parties to the communication request. The busses provided by the network structure, and the direction thereof, may depend on the type of the communication request and, for example, the communication protocol that is used. For example, a network structure operating according to an Advanced eXtensible Interface (AXI) protocol, such as AXI4, may support read requests and write requests. Network structures operating according to other protocols may also support read requests and write requests.

In a read request, the network structure may provide a read address bus and a read data bus. The read address bus may be directed from a requestor compute element and to a responder compute element. Over the read address bus, the requestor compute element may provide control data including, for example, an address or other identifier of the requested data. The read data bus may be directed from the responder compute element and to the requestor compute element. Upon receiving the control data, the responder compute element may retrieve the requested data and provide it to the requestor compute element via the read data bus. The read data provided on the read data bus may include an identifier indicating the initial read request. In this way, the requestor compute element may relate the read data to the initial read request.

In a write request, the network structure may provide a write address bus, a write data bus and a write confirmation bus. The write address bus and write data bus may be directed from the requestor compute element to the responder compute element. On the write data bus, the requestor compute element may provide data to be written by the responder compute element. For example, the responder compute element may be a hardware memory device and/or hardware memory controller. On the write address bus, the requestor compute element may provide various data including, for example, an address or location where the data is to be written. The write confirmation bus may be directed from the responder compute element to the requestor compute element. When the responder compute element has written the data, it may provide write response data on the write confirmation bus. The write response data may indicate that the transaction between the parties is complete. For example, the write response data may include an identifier indicating the original write request. In this way, when the requestor compute element receives the write response data, it may provide an indication of the write request that is complete.

The network structure maintains state data for communication requests that are open or in-flight. The state data may describe, for example, an identifier of the open read or write request, the compute elements that are parties to the communication and an indication of the portions of the communication request (if any) that are completed. The communication request may be open or in-flight until all portions of the communication request are completed. The network structure may use the state data to selectively provide connections to the appropriate busses between the appropriate compute elements at the appropriate times. When a communication request is completed and, therefore, no longer open or in-flight, the network structure may clear the state data for that communication request.

Consider an example read request. State data for the read request may describe, for example, addresses and/or other identifiers of the requestor and responder compute elements for the read request and a state of completion of the read request. For example, the state data may describe whether the requestor compute element has provided address and/or control data to the responder compute element via the read address bus and whether the responder component has provided the requested read data to the requestor compute element.

The network structure may use the state data to track the various requests being handled by the network structure and, in some examples, to order the delivery of response messages. For example, when the responder compute element provides the read data, the network structure may retrieve state data for the corresponding read request and use the state data. In some examples, the state data is used to order the provision of the read data to the requestor element. When the read request is no longer open, the network structure may release the memory locations used to store the state data for that read request, for example, by deleting the state data and/or marking the memory locations available for overwriting.

Now consider an example write request. State data for the write request may describe, for example, addresses and/or other identifiers of the requestor and responder compute elements for the write request and a state of completion of the write request. For example, the state data may indicate whether the requestor compute element has provided address and/or control data via the write address bus, whether the requestor compute element has provided the write data via the write bus, and/or whether the responder compute element has provided the write response data via the write confirmation bus. The network structure may retrieve the state data when a write response is retrieved and, in some examples, may utilize the state data to order the provision of the write request to the requesting element. The write request may be open or in-flight until the write response data is provided to the requestor data. When the write request is no longer open, the network structure may release the memory locations used to store the state data for that write request, for example, by deleting the state data and/or marking the memory locations available for overwriting.

Network structures may have finite memory resources for storing state data. Accordingly, many network structures can support only a limited number of open read or write requests at a given time. This can create challenges in systems, such as CNM systems, that may utilize network structures according to AXI or similar protocols to manage communications between large numbers of compute elements. For example, if too many communications requests are open or in-flight at a given network structure, the network structure may become deadlocked and, thereby, unavailable to handle additional communication requests. Also, systems that are limited in this way may lose programming flexibility. For example, such systems may be programmed to maintain the number of open or in-flight communication requests at a given network structure at any one time below the maximum that the network structure can handle. Programming the system to reduce open or in-flight communication requests may involve compromises and less than optional design and/or programming in other areas, making the system less efficient in achieving other objectives.

In an example, a CNM or other suitable system is arranged to utilize write requests for communications between hardware compute elements. A first hardware compute element may send a write request to a second hardware compute element via a network structure. As described herein, the network structure may provide a first write address bus and a first write data bus between the first hardware element and the second hardware element. The first hardware compute element may provide first address data and first source identifier data via the first write address bus. The first hardware compute element may also provide first payload data via the first write bus. The first payload data may describe a processing task requested by the first hardware compute element. The processing task may be a write of the payload data to a memory device or other data storage location. In some examples, the processing task is a task that operates on data stored at a different part of the CNM system. Accordingly, the first hardware compute element may use the first write request to request that the processing task be performed by a hardware compute element nearer to the data than the requesting compute element. In another example, the first hardware compute element may request that a processing task be performed by another compute element having a hardware configuration that is more favorable for the processing task than that of the first compute element.

After receiving the first write request, the second hardware compute element may send a write confirmation data to the first hardware compute element via a write confirm bus provided by the network structure. The second compute element may send the write confirmation data before the processing task is completed. When the write confirm request is sent, the network structure may clear state data for the first write request, thereby freeing the network structure to accept additional communication requests. After sending the write confirm request, the second hardware compute element may perform the requested processing task and/or instruct another hardware compute element to perform the requested processing task. When the requested processing task is complete, the second hardware compute element may send a second write request to the first hardware compute element. The second write request may comprise payload data indicating that the processing task is complete. This may provide the first compute element with credit for its initial request that the first processing task be completed. In this example, however, the network structure may not need to maintain state data for the first write request until the processing task is complete. This may free capacity at the network structure to handle additional communication requests while the processing task is being performed, increasing the capacity of the network structure.

In another example, a requestor compute element sends a request message to another component of the CNM. The requestor compute element may request performance of a processing task, for example, by a different compute element. The request message may be a write request message handled by a network structure, as described herein.

In an example, the requestor compute element directs the request message to a balancer element. The request message may describe the processing task to be performed. In some examples, the request message is a write request message, as described herein. The balancer element may be a hardware compute element of a CNM system that directs request messages and/or processing tasks to other, different compute elements. In an example, the balancer element receives a request and selects a compute element to execute the requested processing task. The balancer element may direct a request message to the selected responder compute element to instruct the responder compute element to execute the requested processing task. In another example, the balancer element may determine that the processing task should be executed at another location of the CNM system, such as at a different node, at a different memory device, and/or a different memory device component. Instead of sending a request message directly to a responder compute element, the balancer element may send a request message to another portion of the CNM architecture (e.g., to a different balancer element at a different node, memory device or the like). That balancer element may send a request message to a responder compute element and/or to another balancer element, and so on until the responder compute element is selected and instructed.

Consider an example in which the balancer element receives a first request message from a requestor compute element via a first network structure and directs a corresponding second request message to another compute element via the first network structure. The first network structure may store state data for the first request message from the requestor compute element to the balancer element. The first network structure may also store state data for the second request message from the balancer element to the responder compute element. When the responder compute element receives the request message, it may send a confirmation data to the balancer element, which may cause the network structure to close the second request message, for example, by clearing state data as described herein. When the balancer element receives the confirmation data, it may also send different confirmation data to the requesting compute element, which may cause the network structure to clear the first request message, for example, by deleting its state data for the first request message. As described herein, this arrangement may tax the memory of the various network structures, which may hold the various requests open until the respective confirmation data are received. This can lead to deadlock situations where processing is prevented or delayed for lack of network capacity and/or may lead to backpressure on requestor compute elements to limit requests or make fewer long latency requests.

In an example, upon receiving a request message from a requestor compute element, a balancer element may send a next request message to a next component in the CRM architecture and also send a confirmation data to the requesting compute element. In this way, the network structure between the requestor compute element may clear the initial request message, for example, before the delivery of the request message to the ultimate responder compute element is credited. When the responder compute element receives the request message (and in some examples after the responder compute element performs the requested processing task), it may initiate another request message to credit receipt of the initial request message. In this way, the various network structures of CNM system architecture may not maintain state data as long, thereby mitigating backpressure and deadlock concerns.

FIG. 1 illustrates generally a first example of a compute-near-memory system, or CNM system 102. The example of the CNM system 102 includes multiple different memory-compute nodes, such as can each include various compute-near-memory devices. Each node in the system can operate in its own operating system (OS) domain (e.g., Linux, among others). In an example, the nodes can exist collectively in a common OS domain of the CNM system 102.

The example of FIG. 1 includes an example of a first memory-compute node 104 of the CNM system 102. The CNM system 102 can have multiple nodes, such as including different instances of the first memory-compute node 104, that are coupled using a scale fabric 106. In an example, the architecture of the CNM system 102 can support scaling with up to n different memory-compute nodes (e.g., n=4096) using the scale fabric 106. As further discussed below, each node in the CNM system 102 can be an assembly of multiple devices.

The CNM system 102 can include a global controller for the various nodes in the system, or a particular memory-compute node in the system can optionally serve as a host or controller to one or multiple other memory-compute nodes in the same system. The various nodes in the CNM system 102 can thus be similarly or differently configured.

In an example, each node in the CNM system 102 can comprise a host system that uses a specified operating system. The operating system can be common or different among the various nodes in the CNM system 102. In the example of FIG. 1, the first memory-compute node 104 comprises a host system 108, a first switch 110, and a first memory-compute device 112. The host system 108 can comprise a processor, such as can include an X86, ARM, RISC-V, or other type of processor. The first switch 110 can be configured to facilitate communication between or among devices of the first memory-compute node 104 or of the CNM system 102, such as using a specialized or other communication protocol, generally referred to herein as a chip-to-chip protocol interface (CTCPI). That is, the CTCPI can include a specialized interface that is unique to the CNM system 102, or can include or use other interfaces such as the compute express link (CXL) interface, the peripheral component interconnect express (PCIe) interface, the chiplet protocol interface (CPI), and/or AXI among others. The first switch 110 can include a switch configured to use the CTCPI. For example, the first switch 110 can include a CXL switch, a PCIe switch, a CPI switch, or other type of switch. In an example, the first switch 110 can be configured to couple differently configured endpoints. For example, the first switch 110 can be configured to convert packet formats, such as between PCIe and CPI formats and/or between AXI and CXL formats, among others.

The CNM system 102 is described herein in various example configurations, such as comprising a system of nodes, and each node can comprise various chips (e.g., a processor, a switch, a memory device, etc.). In an example, the first memory-compute node 104 in the CNM system 102 can include various chips implemented using chiplets. In the below-discussed chiplet-based configuration of the CNM system 102, inter-chiplet communications, as well as additional communications within the system, can use a CPI network. The CPI network described herein is an example of the CTCPI, that is, as a chiplet-specific implementation of the CTCPI. As a result, the below-described structure, operations, and functionality of CPI can apply equally to structures, operations, and functions as may be otherwise implemented using non-chiplet-based CTCPI implementations. Unless expressly indicated otherwise, any discussion herein of CPI applies equally to CTCPI.

A CPI interface includes a packet-based network that supports virtual channels to enable a flexible and high-speed interaction between chiplets, such as can comprise portions of the first memory-compute node 104 or the CNM system 102. The CPI can enable bridging from intra-chiplet networks to a broader chiplet network. For example, AXI is a specification for intra-chip communications. AXI specifications, however, cover a variety of physical design options, such as the number of physical channels, signal timing, power, etc. Within a single chip, these options are generally selected to meet design goals, such as power consumption, speed, etc. However, to achieve the flexibility of a chiplet-based memory-compute system, an adapter, such as using CPI, can interface between the various AXI design options that can be implemented in the various chiplets. By enabling a physical-channel-to-virtual channel mapping and encapsulating time-based signaling with a packetized protocol, CPI can be used to bridge intra-chiplet networks, such as within a particular memory-compute node, across a broader chiplet network, such as across the first memory-compute node 104 or across the CNM system 102.

The CNM system 102 is scalable to include multiple-node configurations. That is, multiple different instances of the first memory-compute node 104, or of other differently configured memory-compute nodes, can be coupled using the scale fabric 106, to provide a scaled system. Each of the memory-compute nodes can run its own operating system and can be configured to jointly coordinate system-wide resource usage.

In the example of FIG. 1, the first switch 110 of the first memory-compute node 104 is coupled to the scale fabric 106. The scale fabric 106 can provide a switch (e.g., a CTCPI switch, a PCIe switch, a CPI switch, or other switch) that can facilitate communication among and between different memory-compute nodes. In an example, the scale fabric 106 can help various nodes communicate in a partitioned global address space (PGAS).

In an example, the first switch 110 from the first memory-compute node 104 is coupled to one or multiple different memory-compute devices, such as including the first memory-compute device 112. The first memory-compute device 112 can comprise a chiplet-based architecture referred to herein as a compute-near-memory (CNM) chiplet. A packaged version of the first memory-compute device 112 can include, for example, one or multiple CNM chiplets. The chiplets can be communicatively coupled using CTCPI for high bandwidth and low latency.

In the example of FIG. 1, the first memory-compute device 112 can include a network on chip (NOC) or first NOC 118. Generally, a NOC is an interconnection network within a device, connecting a particular set of endpoints. In FIG. 1, the first NOC 118 can provide communications and connectivity between the various memory, compute resources, and ports of the first memory-compute device 112.

In an example, the first NOC 118 can comprise a folded Clos topology, such as within each instance of a memory-compute device, or as a mesh that couples multiple memory-compute devices in a node. The Clos topology, such as can use multiple, smaller radix crossbars to provide functionality associated with a higher radix crossbar topology, offers various benefits. For example, the Clos topology can exhibit consistent latency and bisection bandwidth across the NOC.

The first NOC 118 can include various distinct switch types including hub switches, edge switches, and endpoint switches. Each of the switches can be constructed as crossbars that provide substantially uniform latency and bandwidth between input and output nodes. In an example, the endpoint switches and the edge switches can include two separate crossbars, one for traffic headed to the hub switches, and the other for traffic headed away from the hub switches. The hub switches can be constructed as a single crossbar that switches all inputs to all outputs.

In an example, the hub switches can have multiple ports each (e.g., four or six ports each), such as depending on whether the particular hub switch participates in inter-chip communications. A number of hub switches that participate in inter-chip communications can be set by an inter-chip bandwidth requirement.

The first NOC 118 can support various payloads (e.g., from 8 to 64-byte payloads; other payload sizes can similarly be used) between compute elements and memory. In an example, the first NOC 118 can be optimized for relatively smaller payloads (e.g., 8-16 bytes) to efficiently handle access to sparse data structures.

In an example, the first NOC 118 can be coupled to an external host via a first physical-layer interface 114, a PCIe subordinate module 116 or endpoint, and a PCIe principal module 126 or root port. That is, the first physical-layer interface 114 can include an interface to allow an external host processor to be coupled to the first memory-compute device 112. An external host processor can optionally be coupled to one or multiple different memory-compute devices, such as using a PCIe switch or other, native protocol switch. Communication with the external host processor through a PCIe-based switch can limit device-to-device communication to that supported by the switch. Communication through a memory-compute device-native protocol switch such as using CTCPI, in contrast, can allow for more full communication between or among different memory-compute devices, including support for a partitioned global address space, such as for creating threads of work and sending events.

In an example, the CTCPI protocol can be used by the first NOC 118 in the first memory-compute device 112, and the first switch 110 can include a CTCPI switch. The CTCPI switch can allow CTCPI packets to be transferred from a source memory-compute device, such as the first memory-compute device 112, to a different, destination memory-compute device (e.g., on the same or other node), such as without being converted to another packet format.

In an example, the first memory-compute device 112 can include an internal host processor 122. The internal host processor 122 can be configured to communicate with the first NOC 118 or other components or modules of the first memory-compute device 112, for example, using the internal PCIe principal module 126, which can help eliminate a physical layer that would consume time and energy. In an example, the internal host processor 122 can be based on a RISC-V ISA processor, and can use the first physical-layer interface 114 to communicate outside of the first memory-compute device 112, such as to other storage, networking, or other peripherals to the first memory-compute device 112. The internal host processor 122 can control the first memory-compute device 112 and can act as a proxy for operating system-related functionality. The internal host processor 122 can include a relatively small number of processing cores (e.g., 2-4 cores) and a host memory device 124 (e.g., comprising a DRAM module).

In an example, the internal host processor 122 can include PCI root ports. When the internal host processor 122 is in use, then one of its root ports can be connected to the PCIe subordinate module 116. Another of the root ports of the internal host processor 122 can be connected to the first physical-layer interface 114, such as to provide communication with external PCI peripherals. When the internal host processor 122 is disabled, then the PCIe subordinate module 116 can be coupled to the first physical-layer interface 114 to allow an external host processor to communicate with the first NOC 118. In an example of a system with multiple memory-compute devices, the first memory-compute device 112 can be configured to act as a system host or controller. In this example, the internal host processor 122 can be in use, and other instances of internal host processors in the respective other memory-compute devices can be disabled.

The internal host processor 122 can be configured at power-up of the first memory-compute device 112, such as to allow the host to initialize. In an example, the internal host processor 122 and its associated data paths (e.g., including the first physical-layer interface 114, the PCIe subordinate module 116, etc.) can be configured from input pins to the first memory-compute device 112. One or more of the pins can be used to enable or disable the internal host processor 122 and configure the PCI (or other) data paths accordingly.

In an example, the first NOC 118 can be coupled to the scale fabric 106 via a scale fabric interface module 136 and a second physical-layer interface 138. The scale fabric interface module 136, or SIF, can facilitate communication between the first memory-compute device 112 and a device space, such as a partitioned global address space (PGAS). The PGAS can be configured such that a particular memory-compute device, such as the first memory-compute device 112, can access memory or other resources on a different memory-compute device (e.g., on the same or different node), such as using a load/store paradigm. Various scalable fabric technologies can be used, including CTCPI, CPI, Gen-Z, PCI, or Ethernet bridged over CXL. The scale fabric 106 can be configured to support various packet formats. In an example, the scale fabric 106 supports orderless packet communications, or supports ordered packets such as can use a path identifier to spread bandwidth across multiple equivalent paths. The scale fabric 106 can generally support remote operations such as remote memory read, write, and other built-in atomics, remote memory atomics, remote memory-compute device send events, and remote memory-compute device call and return operations.

In an example, the first NOC 118 can be coupled to one or multiple different memory modules, such as including a first memory device 128. The first memory device 128 can include various kinds of memory devices, for example, LPDDR5 or GDDR6, among others. In the example of FIG. 1, the first NOC 118 can coordinate communications with the first memory device 128 via a memory controller 130 that can be dedicated to the particular memory module. In an example, the memory controller 130 can include a memory module cache and an atomic operations module. The atomic operations module can be configured to provide relatively high-throughput atomic operators, such as including integer and floating-point operators. The atomic operations module can be configured to apply its operators to data within the memory module cache (e.g., comprising SRAM memory side cache), thereby allowing back-to-back atomic operations using the same memory location, with minimal throughput degradation.

The memory module cache can provide storage for frequently accessed memory locations, such as without having to re-access the first memory device 128. In an example, the memory module cache can be configured to cache data only for a particular instance of the memory controller 130. In an example, the memory controller 130 includes a DRAM controller configured to interface with the first memory device 128, such as including DRAM devices. The memory controller 130 can provide access scheduling and bit error management, among other functions.

In an example, the first NOC 118 can be coupled to a hybrid threading processor (HTP 140), a hybrid threading fabric (HTF 142) and a host interface and dispatch module (HID 120). The HID 120 can be configured to facilitate access to host-based command request queues and response queues. In an example, the HID 120 can dispatch new threads of execution on processor or compute elements of the HTP 140 or the HTF 142. In an example, the HID 120 can be configured to maintain workload balance across the HTP 140 module and the HTF 142 module.

The hybrid threading processor, or HTP 140, can include an accelerator, such as can be based on a RISC-V instruction set. The HTP 140 can include a highly threaded, event-driven processor in which threads can be executed in single instruction rotation, such as to maintain high instruction throughput. The HTP 140 comprises relatively few custom instructions to support low-overhead threading capabilities, event send/receive, and shared memory atomic operators.

The hybrid threading fabric, or HTF 142, can include an accelerator, such as can include a non-von Neumann, coarse-grained, reconfigurable processor. The HTF 142 can be optimized for high-level language operations and data types (e.g., integer or floating point). In an example, the HTF 142 can support data flow computing. The HTF 142 can be configured to use substantially all of the memory bandwidth available on the first memory-compute device 112, such as when executing memory-bound compute kernels.

The HTP and HTF accelerators of the CNM system 102 can be programmed using various high-level, structured programming languages. For example, the HTP and HTF accelerators can be programmed using C/C++, such as using the LLVM compiler framework. The HTP accelerator can leverage an open source compiler environment, such as with various added custom instruction sets configured to improve memory access efficiency, provide a message passing mechanism, and manage events, among other things. In an example, the HTF accelerator can be designed to enable programming of the HTF 142 using a high-level programming language, and the compiler can generate a simulator configuration file or a binary file that runs on the HTF 142 hardware. The HTF 142 can provide a mid-level language for expressing algorithms precisely and concisely, while hiding configuration details of the HTF accelerator itself. In an example, the HTF accelerator tool chain can use an LLVM front-end compiler and the LLVM intermediate representation (IR) to interface with an HTF accelerator back end.

Figure 2:
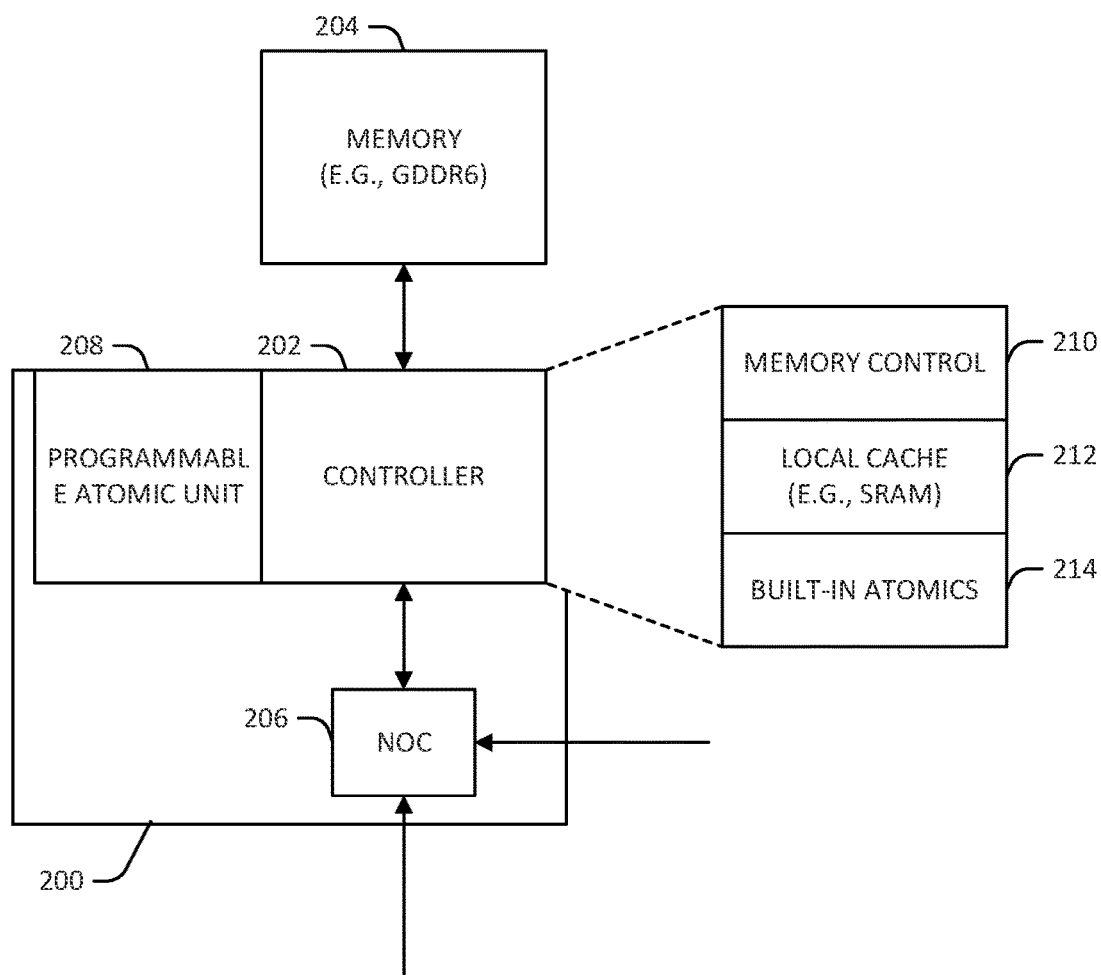
FIG. 2 illustrates generally an example of a memory subsystem of a memory-compute device, according to an embodiment.

FIG. 2 illustrates generally an example of a memory subsystem 200 of a memory-compute device, according to an embodiment. The example of the memory subsystem 200 includes a controller 202, a programmable atomic unit 208, and a second NOC 206. The controller 202 can include or use the programmable atomic unit 208 to carry out operations using information in a memory device 204. The programmable atomic unit 208 is one example of a hardware compute element described elsewhere herein. In an example, the memory subsystem 200 comprises a portion of the first memory-compute device 112 from the example of FIG. 1, such as including portions of the first NOC 118 or of the memory controller 130.

In the example of FIG. 2, the second NOC 206 is coupled to the controller 202 and the controller 202 can include a memory control module 210, a local cache module 212, and a built-in atomics module 214. In an example, the built-in atomics module 214 can be configured to handle relatively simple, single-cycle, integer atomics. The built-in atomics module 214 can perform atomics at the same throughput as, for example, normal memory read or write operations. In an example, an atomic memory operation can include a combination of storing data to the memory, performing an atomic memory operation, and then responding with load data from the memory.

The local cache module 212, such as can include an SRAM cache, can be provided to help reduce latency for repetitively-accessed memory locations. In an example, the local cache module 212 can provide a read buffer for sub-memory line accesses. The local cache module 212 can be particularly beneficial for compute elements that have relatively small or no data caches.

The memory control module 210, such as can include a DRAM controller, can provide low-level request buffering and scheduling, such as to provide efficient access to the memory device 204, such as can include a DRAM device. In an example, the memory device 204 can include or use a GDDR6 DRAM device, such as having 16 Gb density and 64 Gb/sec peak bandwidth. Other devices can similarly be used.

In an example, the programmable atomic unit 208 can comprise single-cycle or multiple-cycle operator such as can be configured to perform integer addition or more complicated multiple-instruction operations such as bloom filter insert. In an example, the programmable atomic unit 208 can be configured to perform load and store-to-memory operations. The programmable atomic unit 208 can be configured to leverage the RISC-V ISA with a set of specialized instructions to facilitate interactions with the controller 202 to atomically perform user-defined operations.

Programmable atomic requests, such as received from an on-node or off-node host, can be routed to the programmable atomic unit 208 via the second NOC 206 and the controller 202. In an example, custom atomic operations (e.g., carried out by the programmable atomic unit 208) can be identical to built-in atomic operations (e.g., carried out by the built-in atomics module 214) except that a programmable atomic operation can be defined or programmed by the user rather than the system architect. In an example, programmable atomic request packets can be sent through the second NOC 206 to the controller 202, and the controller 202 can identify the request as a custom atomic. The controller 202 can then forward the identified request to the programmable atomic unit 208.

Figure 3:
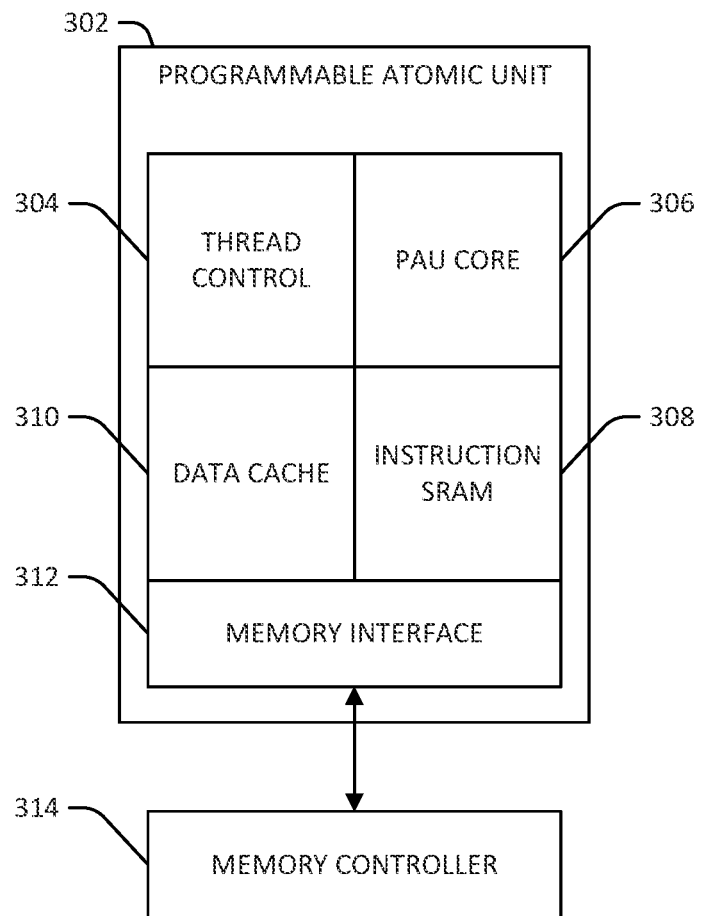
FIG. 3 illustrates generally an example of a programmable atomic unit for a memory controller, according to an embodiment.

FIG. 3 illustrates generally an example of a programmable atomic unit 302 for use with a memory controller, according to an embodiment. In an example, the programmable atomic unit 302 can comprise or correspond to the programmable atomic unit 208 from the example of FIG. 2.

That is, FIG. 3 illustrates components in an example of a programmable atomic unit 302 (PAU), such as those noted above with respect to FIG. 2 (e.g., in the programmable atomic unit 208), or to FIG. 1 (e.g., in an atomic operations module of the memory controller 130). As illustrated in FIG. 3, the programmable atomic unit 302 includes a PAU processor or PAU core 306, a PAU thread control 304, an instruction SRAM 308, a data cache 310, and a memory interface 312 to interface with the memory controller 314. In an example, the memory controller 314 comprises an example of the controller 202 from the example of FIG. 2.

In an example, the PAU core 306 is a pipelined processor such that multiple stages of different instructions are executed together per clock cycle. The PAU core 306 can include a barrel-multithreaded processor, with thread control 304 circuitry to switch between different register files (e.g., sets of registers containing current processing state) upon each clock cycle. This enables efficient context switching between currently executing threads. In an example, the PAU core 306 supports eight threads, resulting in eight register files. In an example, some or all of the register files are not integrated into the PAU core 306, but rather reside in a local data cache 310 or the instruction SRAM 308. This reduces circuit complexity in the PAU core 306 by eliminating the traditional flip-flops used for registers in such memories.

The local PAU memory can include instruction SRAM 308, such as can include instructions for various atomics. The instructions comprise sets of instructions to support various application-loaded atomic operators. When an atomic operator is requested, such as by an application chiplet, a set of instructions corresponding to the atomic operator are executed by the PAU core 306. In an example, the instruction SRAM 308 can be partitioned to establish the sets of instructions. In this example, the specific programmable atomic operator being requested by a requesting process can identify the programmable atomic operator by the partition number. The partition number can be established when the programmable atomic operator is registered with (e.g., loaded onto) the programmable atomic unit 302. Other metadata for the programmable instructions can be stored in memory (e.g., in partition tables) in memory local to the programmable atomic unit 302.

In an example, atomic operators manipulate the data cache 310, which is generally synchronized (e.g., flushed) when a thread for an atomic operator completes. Thus, aside from initial loading from the external memory, such as from the memory controller 314, latency can be reduced for most memory operations during execution of a programmable atomic operator thread.

A pipelined processor, such as the PAU core 306, can experience an issue when an executing thread attempts to issue a memory request if an underlying hazard condition would prevent such a request. Here, the memory request is to retrieve data from the memory controller 314, whether it be from a cache on the memory controller 314 or off-die memory. To resolve this issue, the PAU core 306 is configured to deny the memory request for a thread. Generally, the PAU core 306 or the thread control 304 can include circuitry to enable one or more thread rescheduling points in the pipeline. Here, the denial occurs at a point in the pipeline that is beyond (e.g., after) these thread rescheduling points. In an example, the hazard occurred beyond the rescheduling point. Here, a preceding instruction in the thread created the hazard after the memory request instruction passed the last thread rescheduling point prior to the pipeline stage in which the memory request could be made.

In an example, to deny the memory request, the PAU core 306 is configured to determine (e.g., detect) that there is a hazard on memory indicated in the memory request. Here, hazard denotes any condition such that allowing (e.g., performing) the memory request will result in an inconsistent state for the thread. In an example, the hazard is an in-flight memory request. Here, whether or not the data cache 310 includes data for the requested memory address, the presence of the in-flight memory request makes it uncertain what the data in the data cache 310 at that address should be. Thus, the thread must wait for the in-flight memory request to be completed to operate on current data. The hazard is cleared when the memory request completes.

In an example, the hazard is a dirty cache line in the data cache 310 for the requested memory address. Although the dirty cache line generally indicates that the data in the cache is current and the memory controller version of this data is not, an issue can arise on thread instructions that do not operate from the cache. An example of such an instruction uses a built-in atomic operator, or other separate hardware block, of the memory controller 314. In the context of a memory controller, the built-in atomic operators can be separate from the programmable atomic unit 302 and do not have access to the cache or data cache 310 inside the PAU. If the cache line is dirty, then the built-in atomic operator will not be operating on the most current data until the cache is flushed to synchronize the cache and the other or off-die memories. This same situation could occur with other hardware blocks of the memory controller, such as cryptography block, encoder, etc.

Figure 4:
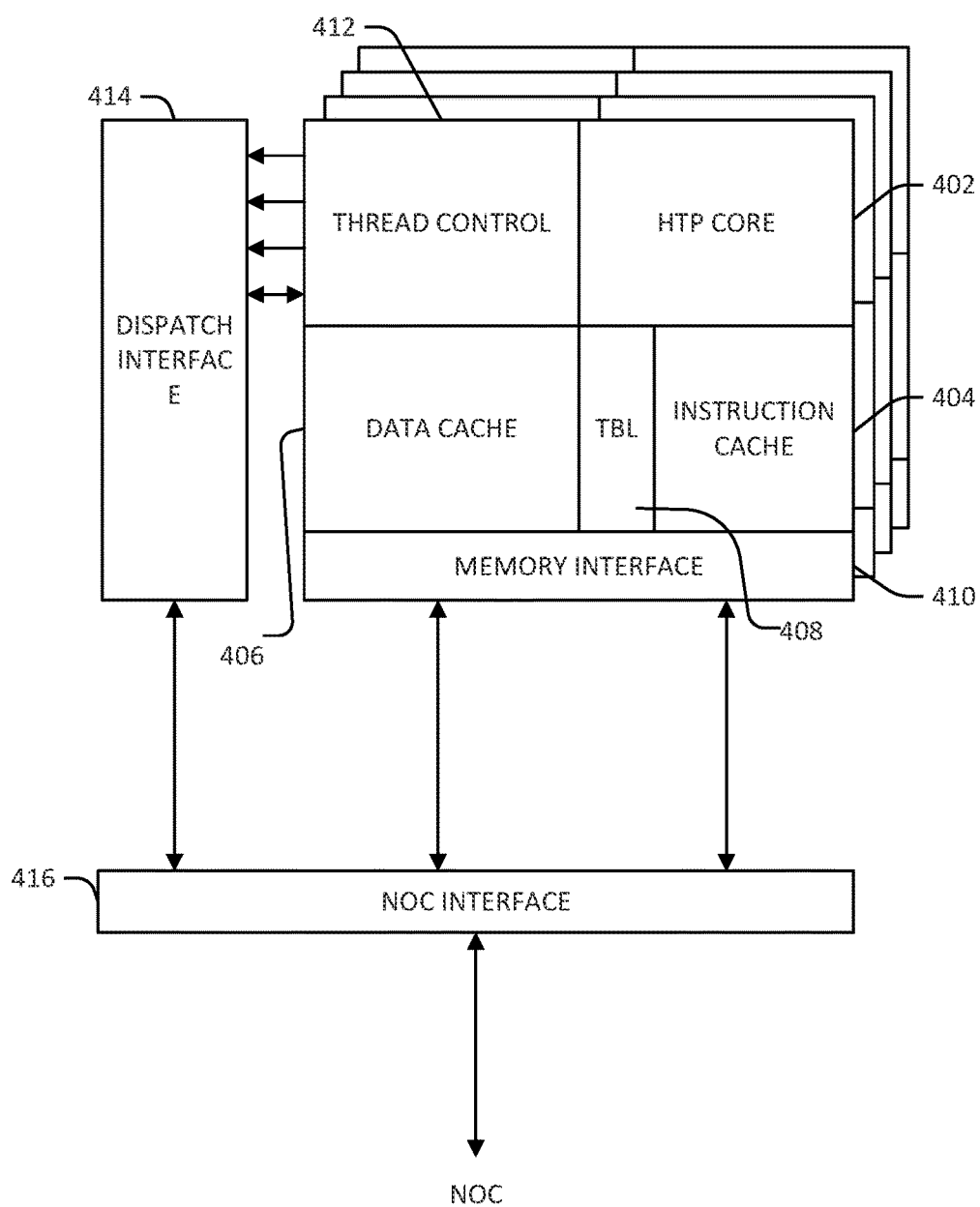
FIG. 4 illustrates an example of a hybrid threading processor (HTP) accelerator of a memory-compute device, according to an embodiment.

FIG. 4 illustrates an example of a hybrid threading processor (HTP) accelerator, or HTP accelerator 400. The HTP accelerator 400 can comprise a portion of a memory-compute device, according to an embodiment. In an example, the HTP accelerator 400 can include or comprise the HTP 140 from the example of FIG. 1. The HTP accelerator 400 includes, for example, a HTP core 402, an instruction cache 404, a data cache 406, a translation block 408, a memory interface 410, and a thread controller 412. The HTP accelerator 400 can further include a dispatch interface 414 and a NOC interface 416, such as for interfacing with a NOC such as the first NOC 118 from the example of FIG. 1, the second NOC 206 from the example of FIG. 2, or other NOC.

In an example, the HTP accelerator 400 includes a module that is based on a RISC-V instruction set, and can include a relatively small number of other or additional custom instructions to support a low-overhead, threading-capable Hybrid Threading (HT) language. The HTP accelerator 400 can include a highly-threaded processor core, the HTP core 402, in which, or with which, threads can be executed in a single instruction rotation, such as to maintain high instruction throughput. In an example, a thread can be paused when it waits for other, pending events to complete. This can allow the compute resources to be efficiently used on relevant work instead of polling. In an example, multiple-thread barrier synchronization can use efficient HTP-to-HTP and HTP-to/from-Host messaging, such as can allow thousands of threads to initialize or wake in, for example, tens of clock cycles.

In an example, the dispatch interface 414 can comprise a functional block of the HTP accelerator 400 for handling hardware-based thread management. That is, the dispatch interface 414 can manage dispatch of work to the HTP core 402 or other accelerators. Non-HTP accelerators, however, are generally not able to dispatch work. In an example, work dispatched from a host can use dispatch queues that reside in, e.g., host main memory (e.g., DRAM-based memory). Work dispatched from the HTP accelerator 400, on the other hand, can use dispatch queues that reside in SRAM, such as within the dispatches for the target HTP accelerator 400 within a particular node.

In an example, the HTP core 402 can comprise one or more cores that execute instructions on behalf of threads. That is, the HTP core 402 can include an instruction processing block. The HTP core 402 can further include, or can be coupled to, the thread controller 412. The thread controller 412 can provide thread control and state for each active thread within the HTP core 402. The data cache 406 can include cache for a host processor (e.g., for local and remote memory-compute devices, including for the HTP core 402), and the instruction cache 404 can include cache for use by the HTP core 402. In an example, the data cache 406 can be configured for read and write operations, and the instruction cache 404 can be configured for read-only operations.

In an example, the data cache 406 is a small cache provided per hardware thread. The data cache 406 can temporarily store data for use by the owning thread. The data cache 406 can be managed by hardware or software in the HTP accelerator 400. For example, hardware can be configured to automatically allocate or evict lines as needed, as load and store operations are executed by the HTP core 402. Software, such as using RISC-V instructions, can determine which memory accesses should be cached, and when lines should be invalidated or written back to other memory locations.

Data caching on the HTP accelerator 400 has various benefits, including making larger accesses more efficient for the memory controller, allowing an executing thread to avoid stalling. However, there are situations when using the cache causes inefficiencies. An example includes accesses where data is accessed only once, and causes thrashing of the cache lines. To help address this problem, the HTP accelerator 400 can use a set of custom load instructions to force a load instruction to check for a cache hit, and on a cache miss to issue a memory request for the requested operand and not put the obtained data in the data cache 406. The HTP accelerator 400 thus includes various different types of load instructions, including non-cached and cache line loads. The non-cached load instructions use the cached data if dirty data is present in the cache. The non-cached load instructions ignore clean data in the cache, and do not write accessed data to the data cache. For cache line load instructions, the complete data cache line (e.g., comprising 64 bytes) can be loaded from memory into the data cache 406, and can load the addressed memory into a specified register. These loads can use the cached data if clean or dirty data is in the data cache 406. If the referenced memory location is not in the data cache 406, then the entire cache line can be accessed from memory. Use of the cache line load instructions can reduce cache misses when sequential memory locations are being referenced (such as memory copy operations) but can also waste memory and bandwidth at the NOC interface 416 if the referenced memory data is not used.

In an example, the HTP accelerator 400 includes a custom store instruction that is non-cached. The non-cached store instruction can help avoid thrashing the data cache 406 with write data that is not sequentially written to memory.

In an example, the HTP accelerator 400 further includes a translation block 408. The translation block 408 can include a virtual-to-physical translation block for local memory of a memory-compute device. For example, a host processor, such as in the HTP core 402, can execute a load or store instruction, and the instruction can generate a virtual address. The virtual address can be translated to a physical address of the host processor, such as using a translation table from the translation block 408. The memory interface 410, for example, can include an interface between the HTP core 402 and the NOC interface 416.

Figure 5:
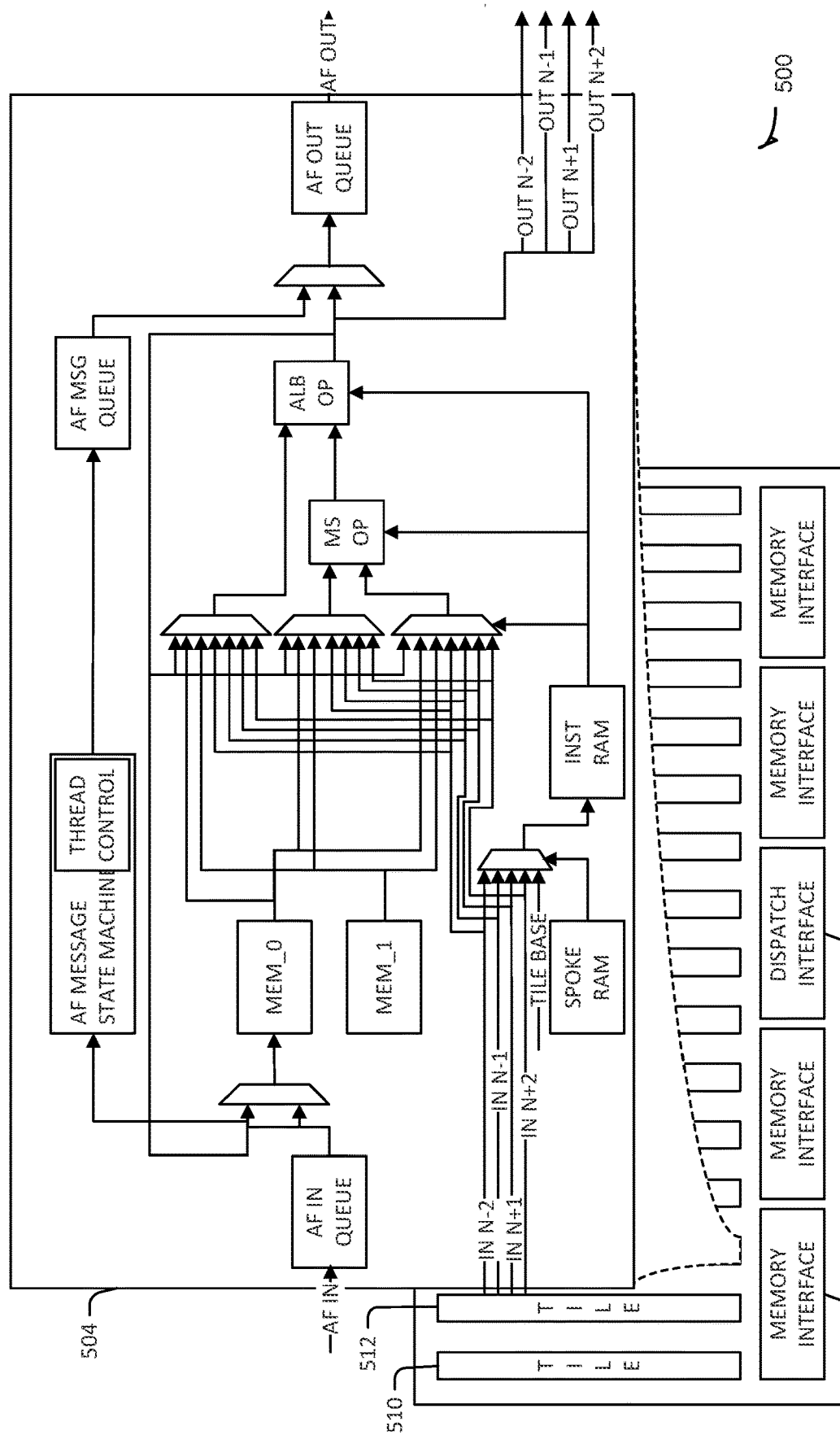
FIG. 5 illustrates an example of a representation of a hybrid threading fabric (HTF) of a memory-compute device, according to an embodiment.

FIG. 5 illustrates an example of a representation of a hybrid threading fabric (HTF), or HTF 500, of a memory-compute device, according to an embodiment. In an example, the HTF 500 can include or comprise the HTF 142 from the example of FIG. 1. The HTF 500 is a coarse-grained, reconfigurable compute fabric that can be optimized for high-level language operand types and operators (e.g., using C/C++ or other high-level language). In an example, the HTF 500 can include configurable, n-bit wide (e.g., 512-bit wide) data paths that interconnect hardened SIMD arithmetic units.

In an example, the HTF 500 comprises an HTF cluster 502 that includes multiple HTF tiles, including an example tile 504, or Tile N. Each HTF tile can implement one or more compute elements with local tile or compute element memory and arithmetic functions. For example, each tile can include a compute pipeline with support for integer and floating-point operations. In an example, the data path, compute elements, and other infrastructure can be implemented as hardened IP to provide maximum performance while reducing power consumption and reconfiguration time.

In the example of FIG. 5, the tiles comprising the HTF cluster 502 are linearly arranged, and each tile in the cluster can be coupled to one or multiple other tiles in the HTF cluster 502. In the example of FIG. 5, the example tile 504, or Tile N, is coupled to four other tiles, including to a tile base of a tile 510 (e.g., Tile N−2) via the port labeled SF IN N−2, to an adjacent tile 512 (e.g., Tile N−1) via the port labeled SF IN N−1, and to a Tile N+1 via the port labeled SF IN N+1 and to a Tile N+2 via the port labeled SF IN N+2. The tile base is a hardware portion of a tile, such as tile 504, 510, 512, that is configured to initiate threads and/or otherwise act as a flow controller. The example tile 504 can be coupled to the same or other tiles via respective output ports, such as those labeled SF OUT N−1, SF OUT N−2, SF OUT N+1, and SF OUT N+2. In this example, the ordered list of names for the various tiles are notional indications of the positions of the tiles. In other examples, the tiles comprising the HTF cluster 502 can be arranged in a grid or other configuration, with each tile similarly coupled to one or several of its nearest neighbors in the grid. Tiles that are provided at an edge of a cluster can optionally have fewer connections to neighboring tiles. For example, Tile N−2, or the tile base of the tile 510 in the example of FIG. 5, can be coupled only to the adjacent tile 512 (Tile N−1) and to the example tile 504 (Tile N). Fewer or additional inter-tile connections can similarly be used.

The HTF cluster 502 can further include memory interface modules, including a first memory interface module 506. The memory interface modules can couple the HTF cluster 502 to a NOC, such as the first NOC 118. In an example, the memory interface modules can allow tiles within a cluster to make requests to other locations in a memory-compute system, such as in the same or different node in the system. That is, the representation of the HTF 500 can comprise a portion of a larger fabric that can be distributed across multiple nodes, such as with one or more HTF tiles or HTF clusters at each of the nodes. Requests can be made between tiles or nodes within the context of the larger fabric.

In the example of FIG. 5, the tiles in the HTF cluster 502 are coupled using a synchronous fabric (SF). The synchronous fabric can provide communication between a particular tile and its neighboring tiles in the HTF cluster 502, as described above. Each HTF cluster 502 can further include an asynchronous fabric (AF) that can provide communication among, e.g., the tiles in the cluster, the memory interfaces in the cluster, and a dispatch interface 508 in the cluster.

In an example, the synchronous fabric can exchange messages that include data and control information. The control information can include, among other things, instruction RAM address information or a thread identifier. The control information can be used to set up a data path, and a data message field can be selected as a source for the path. Generally, the control fields can be provided or received earlier, such that they can be used to configure the data path. For example, to help reduce any delay through the synchronous flow pipeline in a tile, the control information can arrive at a tile a few clock cycles before the data field. Various registers can be provided to help coordinate data-flow timing in the pipeline.

In an example, each tile in the HTF cluster 502 can have one or more tile memories. Each tile memory can have the same width as the data path (e.g., 512 bits) and can have a specified depth, such as in a range of 512 to 1024 elements. The tile memories can be used to store data that supports data path operations. The stored data can include constants loaded as part of a kernel's cluster configuration, for example, or can include variables calculated as part of the data flow. In an example, the tile memories can be written from the asynchronous fabric as a data transfer from another synchronous flow, or can include a result of a load operation such as initiated by another synchronous flow. The tile memory can be read via synchronous data path instruction execution in the synchronous flow.

In an example, each tile in an HTF cluster 502 can have a dedicated instruction RAM (INST RAM). In an example of an HTF cluster 502 with sixteen tiles, and respective instruction RAM instances with sixty-four entries, the cluster can allow algorithms to be mapped with up to 1024 multiply-shift and/or ALU operations. The various tiles can optionally be pipelined together, such as using the synchronous fabric, to allow data flow compute with minimal memory access, thus minimizing latency and reducing power consumption. In an example, the asynchronous fabric can allow memory references to proceed in parallel with computation, thereby providing more efficient streaming kernels. In an example, the various tiles can include built-in support for loop-based constructs, and can support nested looping kernels.

The synchronous fabric can allow multiple tiles (e.g., multiple compute elements thereof) to be pipelined, such as without a need for data queuing. Compute elements that participate in a synchronous flow can, for example, act as a single pipelined data path. A flow controller for a synchronous flow may be or include a tile (e.g., Tile N−2, in the example of FIG. 5), a compute element on a tile, and/or a tile base or controller on a tile. The flow controller of a synchronous flow can initiate a thread of work through the pipelined tiles. The flow controller can be responsible for starting a thread on a predefined cadence referred to herein as a Spoke Count. For example, if the Spoke Count is 3, then the tile base can initiate a thread every third clock cycle.

In an example, the synchronous flow comprises a set of connected compute elements in the HTF cluster 502. Execution of a thread can begin at the flow controller and can progress from the flow controller, via the synchronous fabric, to other compute elements (e.g., at other tiles in the same synchronous flow). The flow controller can provide the instruction to be executed for the first compute element. The first compute element can, by default, provide the same instruction for the other connected compute elements to execute. However, in some examples, the flow controller, or a subsequent compute element, can implement a conditional operation that conditionally specifies or uses an alternative instruction. The alternative instruction can be chosen by having the compute element's data path produce a Boolean conditional value, and then can use the Boolean value to choose between an instruction set of the current compute element and the alternate instruction.

The asynchronous fabric can be used to perform operations that occur asynchronously relative to a synchronous flow. Each tile in the HTF cluster 502 can include an interface to the asynchronous fabric. The inbound interface can include, for example, a FIFO buffer or queue (e.g., AF IN QUEUE) to provide storage for message that cannot be immediately processed. Similarly, the outbound interface of the asynchronous fabric can include a FIFO buffer or queue (e.g., AF OUT QUEUE) to provide storage for messages that cannot be immediately sent out.

In an example, messages in the asynchronous fabric can be classified as data messages or control messages. Data messages can include a SIMD width data value that is written to either tile memory 0 (MEM_0) or memory 1 (MEM_1). Control messages can be configured to control thread creation, to free resources, or to issue external memory references.

A tile in the HTF cluster 502 can perform various compute operations for the HTF. The compute operations can be performed by configuring the data path within the tile and/or compute elements thereof. In an example, a tile includes two functional blocks that perform the compute operations for the tile: a Multiply and Shift Operation block (MS OP) and an Arithmetic, Logical, and Bit Operation block (ALB OP). The two blocks can be configured to perform pipelined operations such as a Multiply and Add, or a Shift and Add, among others.

In an example, each instance of a memory-compute device in a system can have a complete supported instruction set for its operator blocks (e.g., MS OP and ALB OP). In this case, binary compatibility can be realized across all devices in the system. However, in some examples, it can be helpful to maintain a base set of functionality and optional instruction set classes, such as to meet various design tradeoffs, such as die size. The approach can be similar to how the RISC-V instruction set has a base set and multiple optional instruction subsets.

In an example, the example tile 504 can include a Spoke RAM. The Spoke RAM can be used to specify which input (e.g., from among the four SF tile inputs and the tile base input) is the primary input for each clock cycle. The Spoke RAM read address input can originate at a counter that counts from zero to Spoke Count minus one. In an example, different spoke counts can be used on different tiles, such as within the same HTF cluster 502, to allow a number of slices, or unique tile instances, used by an inner loop to determine the performance of a particular application or instruction set. In an example, the Spoke RAM can specify when a synchronous input is to be written to a tile memory, for instance when multiple inputs for a particular tile instruction are used and one of the inputs arrives before the others. The early-arriving input can be written to the tile memory and can be later read when all of the inputs are available. In this example, the tile memory can be accessed as a FIFO memory, and FIFO read and write pointers can be stored in a register-based memory region or structure in the tile memory.

Figure 6A:
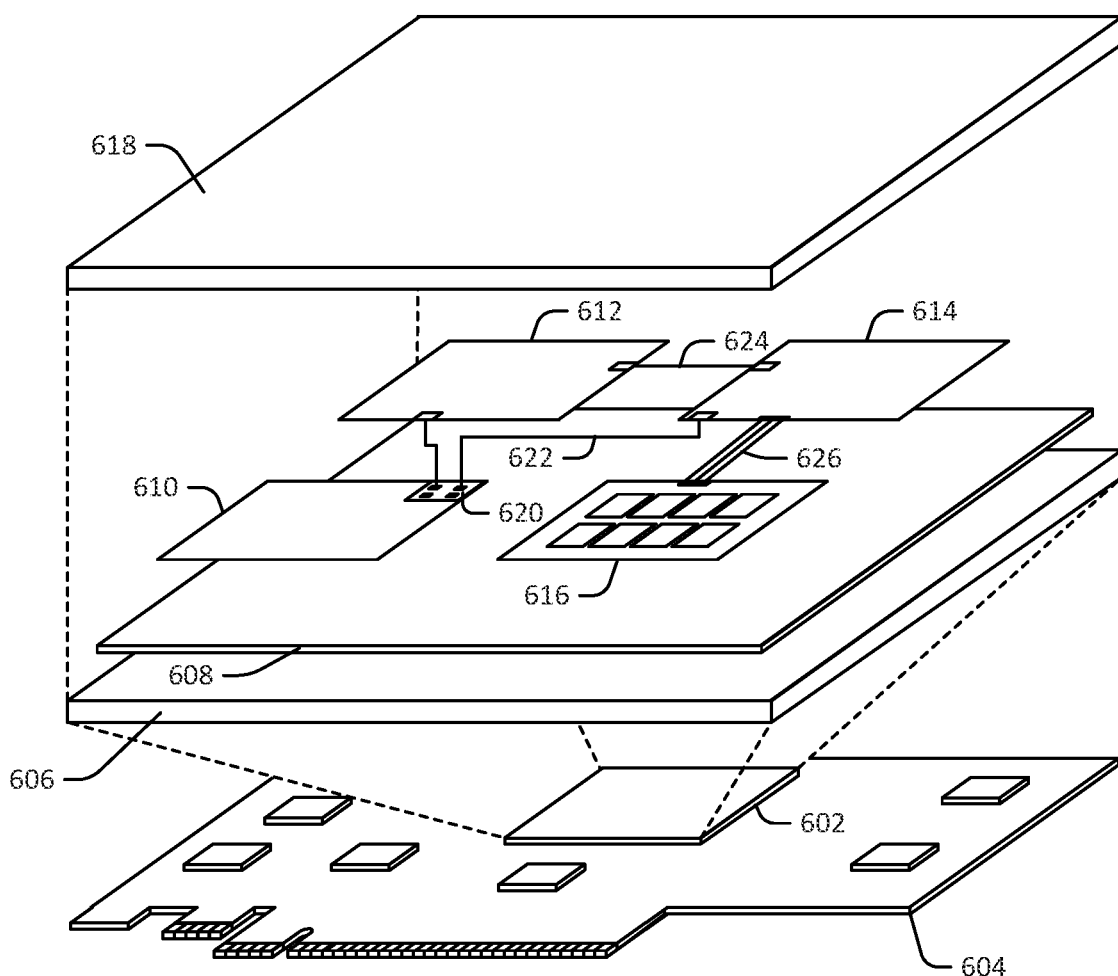
FIG. 6A illustrates generally an example of a chiplet system, according to an embodiment.
Figure 6B:
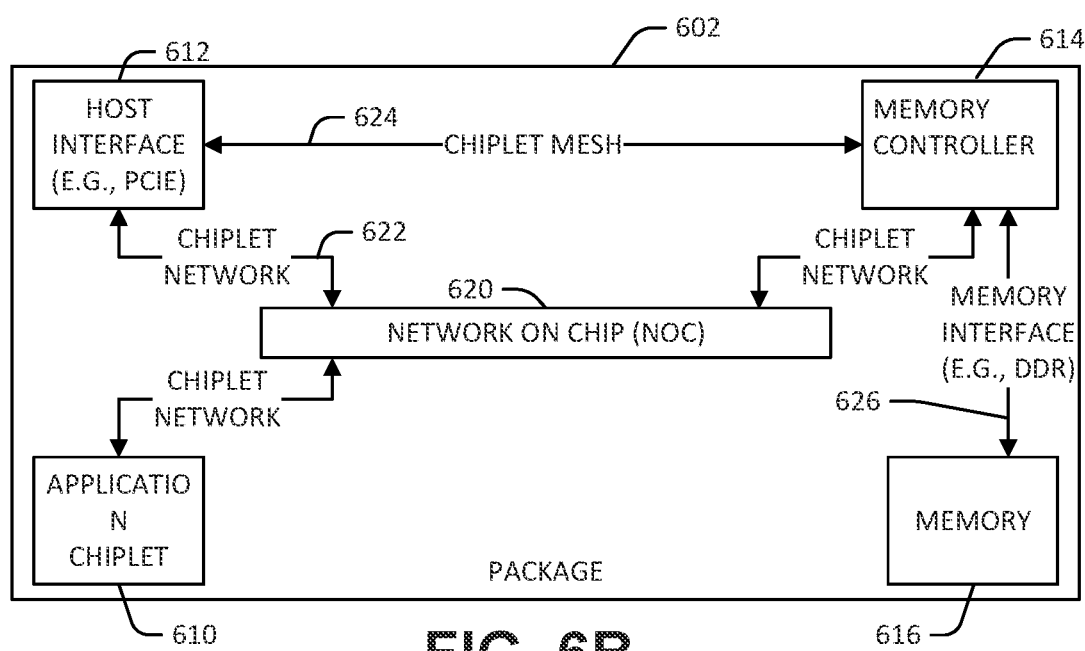
FIG. 6B illustrates generally a block diagram showing various components in the chiplet system from the example of FIG. 6A.

FIG. 6A and FIG. 6B illustrate generally an example of a chiplet system that can be used to implement one or more features of the CNM system 102. As similarly mentioned above, a node in the CNM system 102, or a device within a node in the CNM system 102, can include a chiplet-based architecture or compute-near-memory (CNM) chiplet. A packaged memory-compute device can include, for example, one, two, or four CNM chiplets. The chiplets can be interconnected using high-bandwidth, low-latency interconnects such as using a CPI interface. Generally, a chiplet system is made up of discrete modules (each a "chiplet") that are integrated on an interposer and, in many examples, are interconnected as desired through one or more established networks to provide a system with the desired functionality. The interposer and included chiplets can be packaged together to facilitate interconnection with other components of a larger system. Each chiplet can include one or more individual integrated circuits (ICs), or "chips," potentially in combination with discrete circuit components, and can be coupled to a respective substrate to facilitate attachment to the interposer. Most or all chiplets in a system can be individually configured for communication through established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems can include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced by avoiding the design and production of functionality embodied in the support chiplets.

Chiplets also support the tight integration of IP blocks that can otherwise be difficult, such as those manufactured using different processing technologies or using different feature sizes (or utilizing different contact technologies or spacings). Thus, multiple ICs or IC assemblies, with different physical, electrical, or communication characteristics, can be assembled in a modular manner to provide an assembly with various desired functionalities. Chiplet systems can also facilitate adaptation to suit needs of different larger systems into which the chiplet system will be incorporated. In an example, ICs or other assemblies can be optimized for the power, speed, or heat generation for a specific function— as can happen with sensors—can be integrated with other devices more easily than attempting to do so on a single die. Additionally, by reducing the overall size of the die, the yield for chiplets tends to be higher than that of more complex, single die devices.

FIG. 6A and FIG. 6B illustrate generally an example of a chiplet system, according to an embodiment. FIG. 6A is a representation of the chiplet system 602 mounted on a peripheral board 604, that can be connected to a broader computer system by a peripheral component interconnect express (PCIe), for example. The chiplet system 602 includes a package substrate 606, an interposer 608, and four chiplets: an application chiplet 610, a host interface chiplet 612, a memory controller chiplet 614, and a memory device chiplet 616. Other systems can include many additional chiplets to provide additional functionalities as will be apparent from the following discussion. The package of the chiplet system 602 is illustrated with a lid or cover 618, though other packaging techniques and structures for the chiplet system can be used. FIG. 6B is a block diagram labeling the components in the chiplet system 602 for clarity.

The application chiplet 610 is illustrated as including a chiplet system NOC 620 to support a chiplet network 622 for inter-chiplet communications. In example embodiments the chiplet system NOC 620 can be included on the application chiplet 610. In an example, the first NOC 118 from the example of FIG. 1 can be defined in response to selected support chiplets (e.g., host interface chiplet 612, memory controller chiplet 614, and memory device chiplet 616) thus enabling a designer to select an appropriate number of chiplet network connections or switches for the chiplet system NOC 620. In an example, the chiplet system NOC 620 can be located on a separate chiplet, or within the interposer 608. In examples as discussed herein, the chiplet system NOC 620 implements a chiplet protocol interface (CPI) network.

In an example, the chiplet system 602 can include or comprise a portion of the first memory-compute node 104 or the first memory-compute device 112. That is, the various blocks or components of the first memory-compute device 112 can include chiplets that can be mounted on the peripheral board 604, the package substrate 606, and the interposer 608. The interface components of the first memory-compute device 112 can comprise, generally, the host interface chiplet 612; the memory and memory control-related components of the first memory-compute device 112 can comprise, generally, the memory controller chiplet 614; the various accelerator and processor components of the first memory-compute device 112 can comprise, generally, the application chiplet 610 or instances thereof, and so on.

The CPI interface, such as can be used for communication between or among chiplets in a system, is a packet-based network that supports virtual channels to enable a flexible and high-speed interaction between chiplets. CPI enables bridging from intra-chiplet networks to the chiplet network 622. For example, AXI is a specification for intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 622.

CPI can use a variety of different physical layers to transmit packets. The physical layer can include simple conductive connections, or can include drivers to increase the voltage, or otherwise facilitate transmitting the signals over longer distances. An example of one such a physical layer can include the Advanced Interface Bus (AIB), which in various examples, can be implemented in the interposer 608. AIB transmits and receives data using source synchronous data transfers with a forwarded clock. Packets are transferred across the AIB at single data rate (SDR) or dual data rate (DDR) with respect to the transmitted clock. Various channel widths are supported by AIB. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB principal or subordinate depending on which chiplet provides the principal clock. AIB I/O cells support three clocking modes: asynchronous (i.e. non-clocked), SDR, and DDR. In various examples, the non-clocked mode is used for clocks and some control signals. The SDR mode can use dedicated SDR-only I/O cells, or dual-use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency can be utilized. CPI includes elements to minimize both latency and energy consumption in these ultra-short reach chiplet interconnects.

For flow control, CPI employs a credit-based technique. A recipient, such as the application chiplet 610, provides a sender, such as the memory controller chiplet 614, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender to allow transmitting of additional information.

The example of FIG. 6A includes a chiplet mesh network 624 that uses a direct, chiplet-to-chiplet technique without a need for the chiplet system NOC 620. The chiplet mesh network 624 can be implemented in CPI or another chiplet-to-chiplet protocol. The chiplet mesh network 624 generally enables a pipeline of chiplets where one chiplet serves as the interface to the pipeline while other chiplets in the pipeline interface only with themselves.

Additionally, dedicated device interfaces, such as one or more industry standard memory interfaces (such as, for example, synchronous memory interfaces, such as DDR5, DDR6), can be used to connect a device to a chiplet. Connection of a chiplet system or individual chiplets to external devices (such as a larger system) can be through a desired interface (for example, a PCIe interface). Such an external interface can be implemented, in an example, through the host interface chiplet 612, which in the depicted example provides a PCIe interface external to chiplet system. Such dedicated chiplet interfaces 626 are generally employed when a convention or standard in the industry has converged on such an interface. The illustrated example of a Double Data Rate (DDR) interface connecting the memory controller chiplet 614 to a dynamic random access memory (DRAM) memory device chiplet 616 is just such an industry convention.

Of the variety of possible support chiplets, the memory controller chiplet 614 is likely present in the chiplet system due to the near omnipresent use of storage for computer processing as well as sophisticated state-of-the-art for memory devices. Thus, using memory device chiplets 616 and memory controller chiplets 614 produced by others gives chiplet system designers access to robust products by sophisticated producers. Generally, the memory controller chiplet 614 provides a memory device-specific interface to read, write, or erase data. Often, the memory controller chiplet 614 can provide additional features, such as error detection, error correction, maintenance operations, or atomic operator execution. For some types of memory, maintenance operations tend to be specific to the memory device chiplet 616, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh, can be controlled by a host processor of a memory controller at some times, and at other times controlled by the DRAM memory device, or by logic associated with one or more DRAM devices, such as an interface chip (in an example, a buffer).

Atomic operators are a data manipulation that, for example, can be performed by the memory controller chiplet 614. In other chiplet systems, the atomic operators can be performed by other chiplets. For example, an atomic operator of "increment" can be specified in a command by the application chiplet 610, the command including a memory address and possibly an increment value. Upon receiving the command, the memory controller chiplet 614 retrieves a number from the specified memory address, increments the number by the amount specified in the command, and stores the result. Upon a successful completion, the memory controller chiplet 614 provides an indication of the command success to the application chiplet 610. Atomic operators avoid transmitting the data across the chiplet mesh network 624, resulting in lower latency execution of such commands.

Atomic operators can be classified as built-in atomics or programmable (e.g., custom) atomics. Built-in atomics are a finite set of operations that are immutably implemented in hardware. Programmable atomics are small programs that can execute on a programmable atomic unit (PAU) (e.g., a custom atomic unit (CAU)) of the memory controller chiplet 614.

The memory device chiplet 616 can be, or include any combination of, volatile memory devices or non-volatile memories. Examples of volatile memory devices include, but are not limited to, random access memory (RAM)—such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device chiplet 616 as a chiplet; however, the device can reside elsewhere, such as in a different package on the peripheral board 604. For many applications, multiple memory device chiplets can be provided. In an example, these memory device chiplets can each implement one or multiple storage technologies, and may include integrated compute hosts. In an example, a memory chiplet can include multiple stacked memory die of different technologies, for example one or more static random access memory (SRAM) devices stacked or otherwise in communication with one or more dynamic random access memory (DRAM) devices. In an example, the memory controller chiplet 614 can serve to coordinate operations between multiple memory chiplets in the chiplet system 602, for example, to use one or more memory chiplets in one or more levels of cache storage, and to use one or more additional memory chiplets as main memory. The chiplet system 602 can include multiple memory controller chiplet 614 instances, as can be used to provide memory control functionality for separate hosts, processors, sensors, networks, etc. A chiplet architecture, such as in the illustrated system, offers advantages in allowing adaptation to different memory storage technologies and different memory interfaces, through updated chiplet configurations, such as without requiring redesign of the remainder of the system structure.

Figure 7:
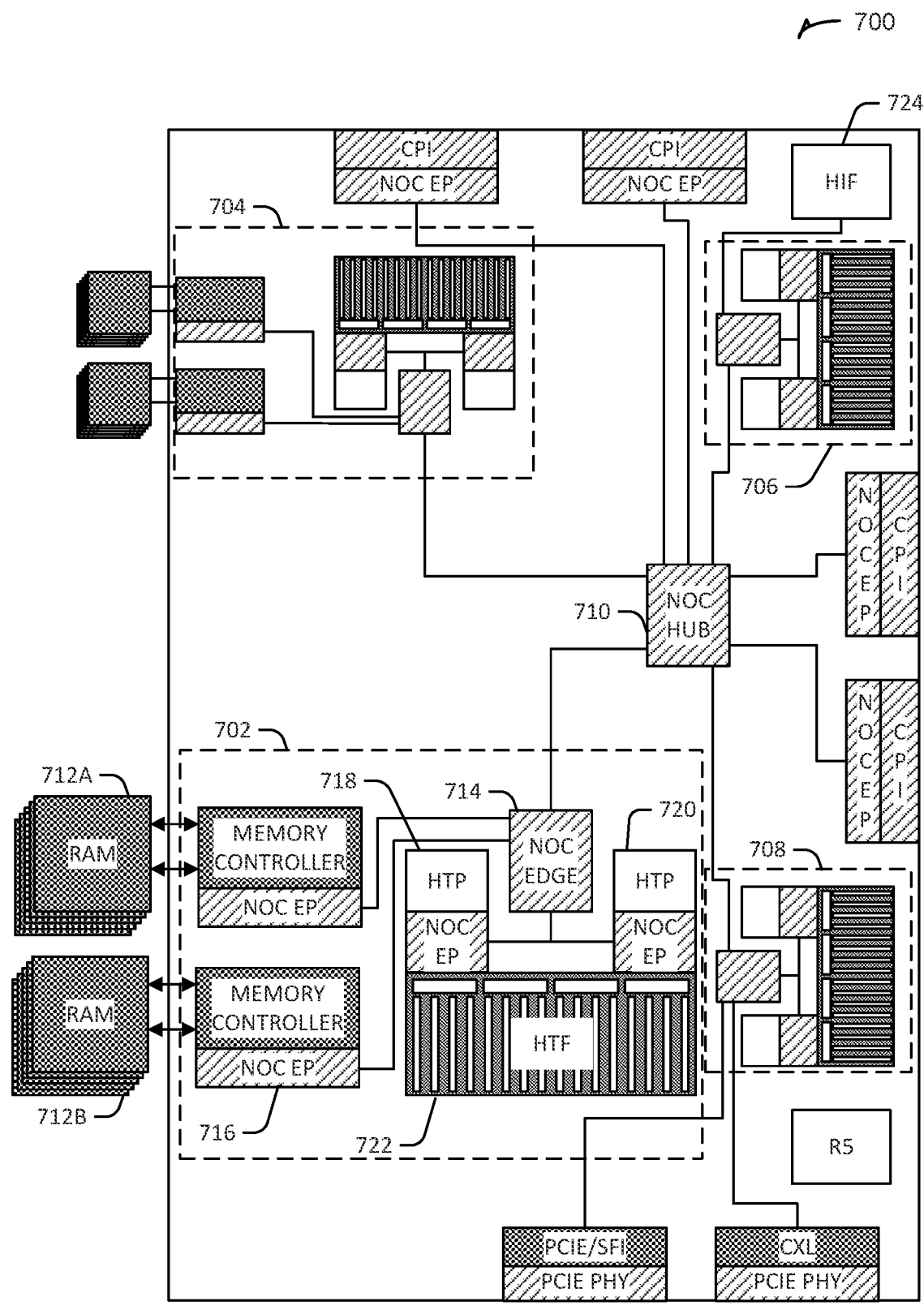
FIG. 7 illustrates generally an example of a chiplet-based implementation for a memory-compute device, according to an embodiment.

FIG. 7 illustrates generally an example of a chiplet-based implementation for a memory-compute device, according to an embodiment. The memory-compute device may be one example of a hardware compute element described elsewhere herein. The example includes an implementation with four compute-near-memory, or CNM, chiplets, and each of the CNM chiplets can include or comprise portions of the first memory-compute device 112 or the first memory-compute node 104 from the example of FIG. 1. The various portions can themselves include or comprise respective chiplets. The chiplet-based implementation can include or use CPI-based intra-system communications, as similarly discussed above in the example chiplet system 602 from FIG. 6A and FIG. 6B.

The example of FIG. 7 includes a first CNM package 700 comprising multiple chiplets. The first CNM package 700 includes a first chiplet 702, a second chiplet 704, a third chiplet 706, and a fourth chiplet 708 coupled to a CNM NOC hub 710. Each of the first through fourth chiplets can comprise instances of the same, or substantially the same, components or modules. For example, the chiplets can each include respective instances of an HTP accelerator, an HTF accelerator, and memory controllers for accessing internal or external memories.

In the example of FIG. 7, the first chiplet 702 includes a first NOC hub edge 714 coupled to the CNM NOC hub 710. The other chiplets in the first CNM package 700 similarly include NOC hub edges or endpoints. The switches in the NOC hub edges facilitate intra-chiplet, or intra-chiplet-system, communications via the CNM NOC hub 710.

The first chiplet 702 can further include one or multiple memory controllers 716. The memory controllers 716 can correspond to respective different NOC endpoint switches interfaced with the first NOC hub edge 714. In an example, the memory controller 716 comprises the memory controller chiplet 614 or comprises the memory controller 130, or comprises the memory subsystem 200, or other memory-compute implementation. The memory controllers 716 can be coupled to respective different memory devices, for example including a first external memory module 712a or a second external memory module 712b. The external memory modules can include, e.g., GDDR6 memories that can be selectively accessed by the respective different chiplets in the system.

The first chiplet 702 can further include a first HTP chiplet 718 and second HTP chiplet 720, such as coupled to the first NOC hub edge 714 via respective different NOC endpoint switches. The HTP chiplets can correspond to HTP accelerators, such as the HTP 140 from the example of FIG. 1, or the HTP accelerator 400 from the example of FIG. 4. The HTP chiplets can communicate with the HTF chiplet 722. The HTF chiplet 722 can correspond to an HTF accelerator, such as the HTF 142 from the example of FIG. 1, or the HTF 500 from the example of FIG. 5.

The CNM NOC hub 710 can be coupled to NOC hub instances in other chiplets or other CNM packages by way of various interfaces and switches. For example, the CNM NOC hub 710 can be coupled to a CPI interface by way of multiple different NOC endpoints on the first CNM package 700. Each of the multiple different NOC endpoints can be coupled, for example, to a different node outside of the first CNM package 700. In an example, the CNM NOC hub 710 can be coupled to other peripherals, nodes, or devices using CTCPI or other, non-CPI protocols. For example, the first CNM package 700 can include a PCIe scale fabric interface (PCIE/SFI) or a CXL interface (CXL) configured to interface the first CNM package 700 with other devices. In an example, devices to which the first CNM package 700 is coupled using the various CPI, PCIe, CXL, or other fabric, can make up a common global address space.

In the example of FIG. 7, the first CNM package 700 includes a host interface 724 (HIF) and a host processor (R5). The host interface 724 can correspond to, for example, the HID 120 from the example of FIG. 1. The host processor, or R5, can correspond to the internal host processor 122 from the example of FIG. 1. The host interface 724 can include a PCI interface for coupling the first CNM package 700 to other external devices or systems. In an example, work can be initiated on the first CNM package 700, or a tile cluster within the first CNM package 700, by the host interface 724. For example, the host interface 724 can be configured to command individual HTF tile clusters, such as among the various chiplets in the first CNM package 700, into and out of power/clock gate modes.

Figure 8:
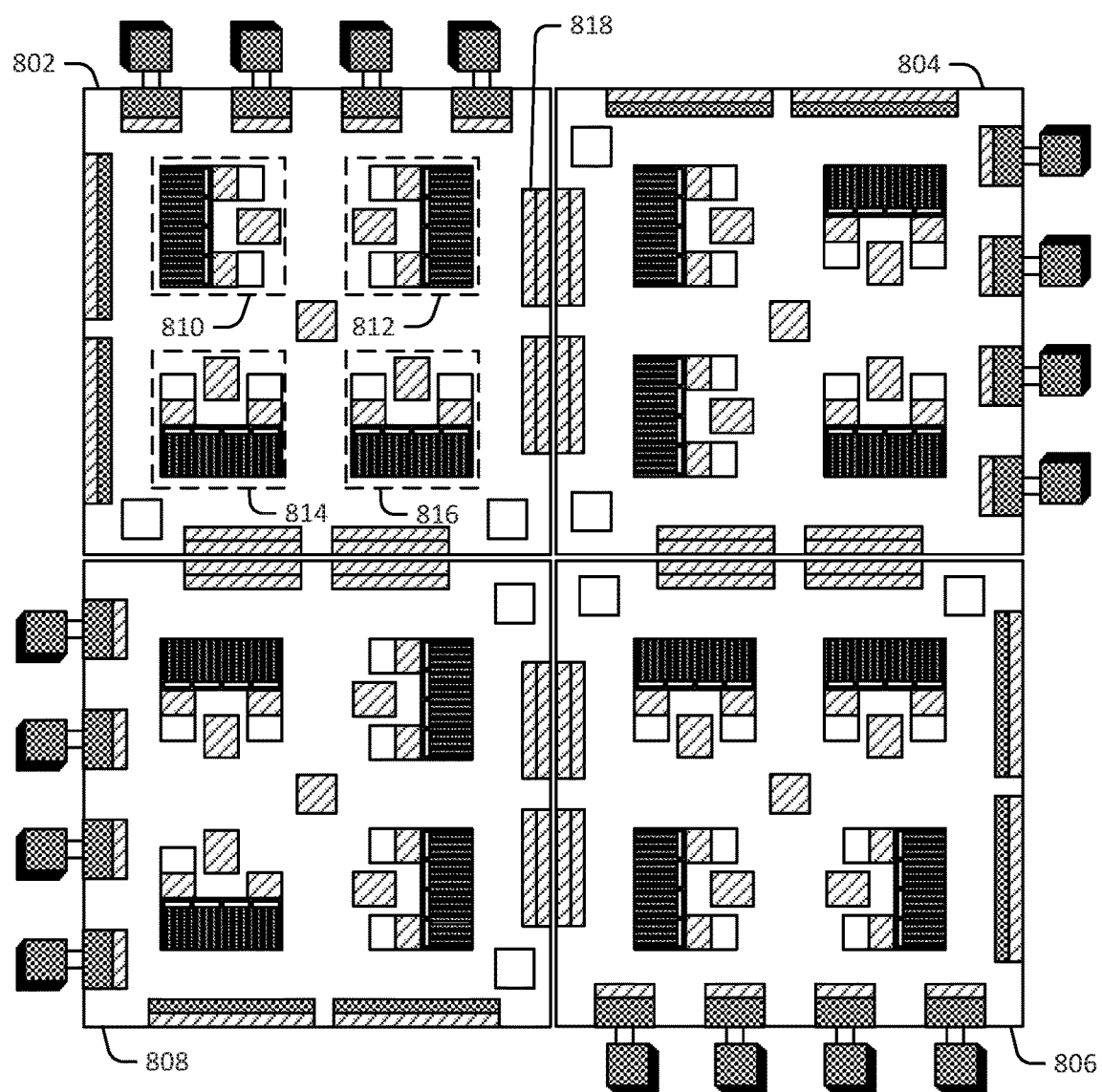
FIG. 8 illustrates an example tiling of memory-compute device chiplets, according to an embodiment.

FIG. 8 illustrates an example tiling of memory-compute devices, according to an embodiment. In FIG. 8, a tiled chiplet example 800 includes four instances of different compute-near-memory clusters of chiplets, where the clusters are coupled together. Each instance of a compute-near-memory chiplet can itself include one or more constituent chiplets (e.g., host processor chiplets, memory device chiplets, interface chiplets, and so on).

The tiled chiplet example 800 includes, as one or multiple of its compute-near-memory (CNM) clusters, instances of the first CNM package 700 from the example of FIG. 7. For example, the tiled chiplet example 800 can include a first CNM cluster 802 that includes a first chiplet 810 (e.g., corresponding to the first chiplet 702), a second chiplet 812 (e.g., corresponding to the second chiplet 704), a third chiplet 814 (e.g., corresponding to the third chiplet 706), and a fourth chiplet 816 (e.g., corresponding to the fourth chiplet 708). The chiplets in the first CNM cluster 802 can be coupled to a common NOC hub, which in turn can be coupled to a NOC hub in an adjacent cluster or clusters (e.g., in a second CNM cluster 804 or a fourth CNM cluster 808).

In the example of FIG. 8, the tiled chiplet example 800 includes the first CNM cluster 802, the second CNM cluster 804, a third CNM cluster 806, and the fourth CNM cluster 808. The various different CNM chiplets can be configured in a common address space such that the chiplets can allocate and share resources across the different tiles. In an example, the chiplets in the cluster can communicate with each other. For example, the first CNM cluster 802 can be communicatively coupled to the second CNM cluster 804 via an inter-chiplet CPI interface 818, and the first CNM cluster 802 can be communicatively coupled to the fourth CNM cluster 808 via another or the same CPI interface. The second CNM cluster 804 can be communicatively coupled to the third CNM cluster 806 via the same or other CPI interface, and so on.

In an example, one of the compute-near-memory chiplets in the tiled chiplet example 800 can include a host interface (e.g., corresponding to the host interface 724 from the example of FIG. 7) that is responsible for workload balancing across the tiled chiplet example 800. The host interface can facilitate access to host-based command request queues and response queues, such as from outside of the tiled chiplet example 800. The host interface can dispatch new threads of execution using hybrid threading processors and the hybrid threading fabric in one or more of the compute-near-memory chiplets in the tiled chiplet example 800.

Figure 9:
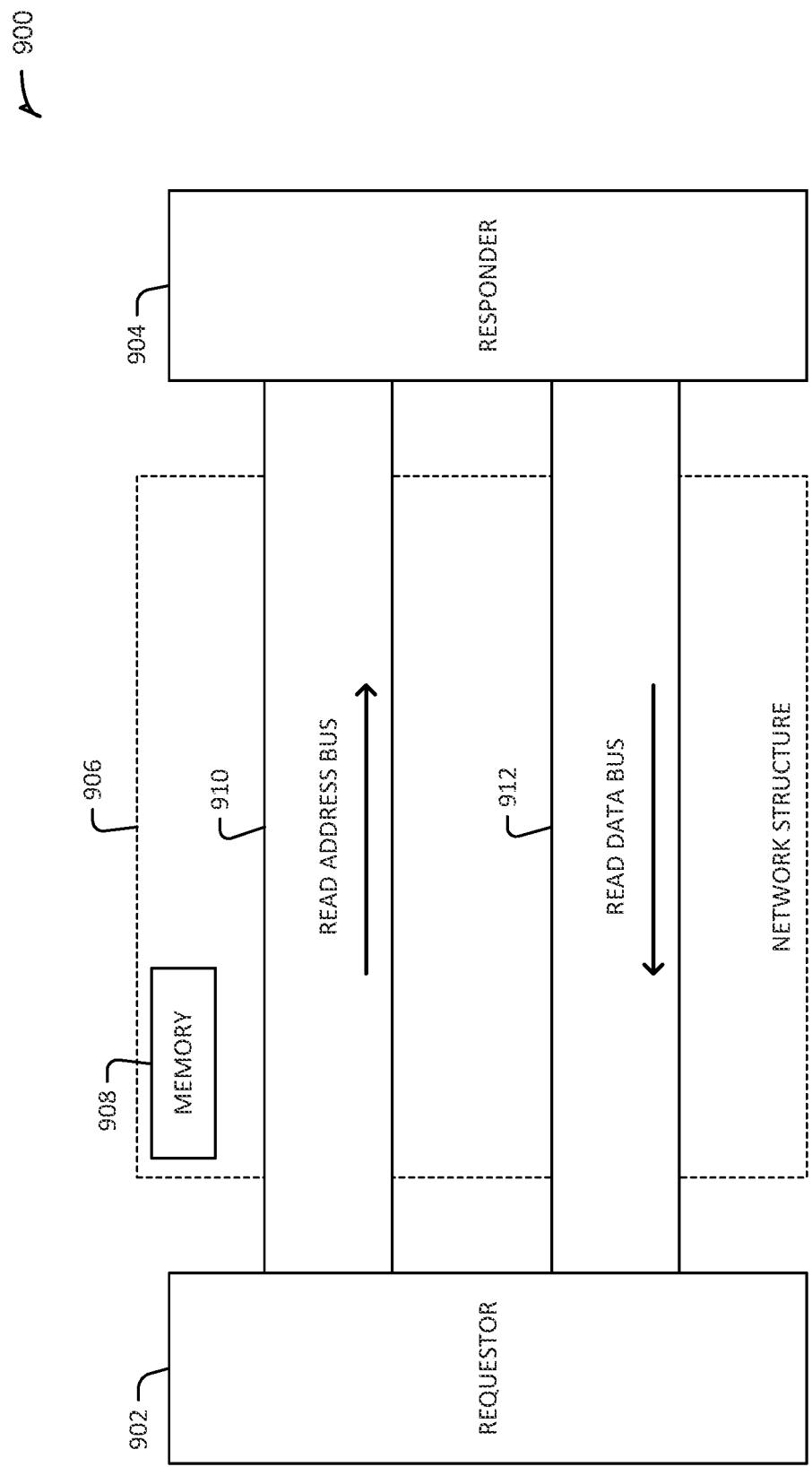
FIG. 9 illustrates an example arrangement including a read request made by a requestor hardware compute element to a responder hardware compute element.

FIG. 9 illustrates an example arrangement 900 including a read request made by a requestor hardware compute element 902 to a responder hardware compute element 904. The arrangement 900 includes the requestor hardware compute element 902, the responder hardware compute element 904 and a network structure 906.

The network structure 906 may be a hardware component or combination of components that connect hardware compute elements, such as the requestor compute element 902 and responder compute element 904. Referring to the example of FIG. 1, the scale fabric 106, the first switch 110, and the NOC 118 may make up all or part of a network structure such as the network structure 906. Also, although the arrangement 900 of FIG. 9 shows the network structure 906 in communication with two compute elements 902, 904, it will be appreciated that the network structure 906 may be in communication with additional compute elements and may support multiple read requests and/or write requests simultaneously.

The requestor compute element 902 and responder compute element 904 may be or include any suitable hardware element that performs and/or requests a processing task. Using the example of FIGS. 1-8, the requestor compute element 902 and responder compute element 904 may be or include, for example, components of an HTP 140, elements of an HTF 142, a memory controller 130, and/or the like. In the arrangement 900 of FIG. 9, a read request is made by the requestor compute element 902 directed towards the responder compute element 904. In various examples, however, a compute element may be capable of both making and receiving read requests.

In the example of FIG. 9, the requestor compute element 902 makes a read request, for example, by providing read control data to the network structure 906. The read control data may include an address or other indicator of the responder compute element 904, an indicator of the desired data to be read, and/or other data. The network structure 906 is switched to a state that provides a read address bus 910 between the requestor compute element 902 and the responder compute element 904. The read address bus 910 may comprise a predetermined number of channels with each channel supporting the transfer of a predetermined size data unit from the requestor compute element 902 to the responder compute element 904. For example, the read address bus 910 may comprise a first channel sized to transfer an indicator of the data to be read, a second channel sized to transfer an indicator of the responder compute element 904, and/or the like. In an example, the read address bus 910 comprises a number of data paths for transferring all or part of the read control data between the requestor compute element 902 and the responder compute element 904.

The responder compute element 904, upon receiving the read control data, may provide read data in response. The read data may include, for example, data described by the read control data. In an example, upon receiving read control data via the read address bus 910, the responder compute element 904 retrieves the requested data. The network structure 906 may be switched to a state that provides the read data bus 912 between the responder compute element 904 and the requestor compute element 902. The responder compute element 904 may provide the read data to the requestor compute element 902 via the read data bus 912. The read data bus 912, for example, may include a number of parallel data paths for transmitting all or a portion of the read data in parallel from the responder compute element 904 to the requestor compute element 902.

The network structure 906 may be selectively switched to provide the read address bus 910 and read data bus 912 between the respective requestor compute element 902 and responder compute element 904 when needed to facilitate the read request. For example, the network structure 906 may comprise hardware for implementing multiple busses, including multiple read address busses 910, multiple read data busses 912. The network structure 906 may also include hardware for implementing various write request busses, such as busses 1010, 1012, and 1014 described with respect to FIG. 10. To facilitate data transfer between compute elements in a read request (or write request), the network structure 906 is switched to states that provide the appropriate bus or busses between the compute elements, such as the compute elements 902, 904.

The network structure 906 also comprises a memory 908. The memory 908 may store state data describing various read and/or write requests that are open or in-flight. For example, the read request illustrated in FIG. 9 may commence when the requestor compute element 902 provides the read control data to the network structure 906. In response, the network structure 906 may switch to a state that provides the read address bus 910 between the requestor compute element 902 and responder compute element 904. In this way, the requestor compute element 902 may provide the read control data to the responder compute element 904. The network structure 906 may also store a state of various read and/or write requests that are open. Consider an example in which read control data has been provided to the responder compute element 904 but read data has been not yet been transferred back to the requestor compute element 902. The network structure 906 may store an indication of this open read request at memory 908. The state data may include, for example, an indication of the requestor compute element 902, an indication of the responder compute element 904 and an indication that the read control data has been provided but no read data has been transferred back, and/or other data. When the responder compute element 904 provides the read data, the network structure 906 may be switched to a state that provides the read data bus 912 between the responder compute element 904 and the requestor compute element 902. The responder compute element 904 may transmit the read data to the requestor compute element 902 via the read data bus 912. When this transfer occurs, the read request may be complete. Accordingly, the network structure 906 may clear its state data describing the read request, for example, by deleting the state data and/or releasing the locations at the memory 908 storing the state data to be overwritten by new data (e.g., state data for a different communication request).

Figure 10:
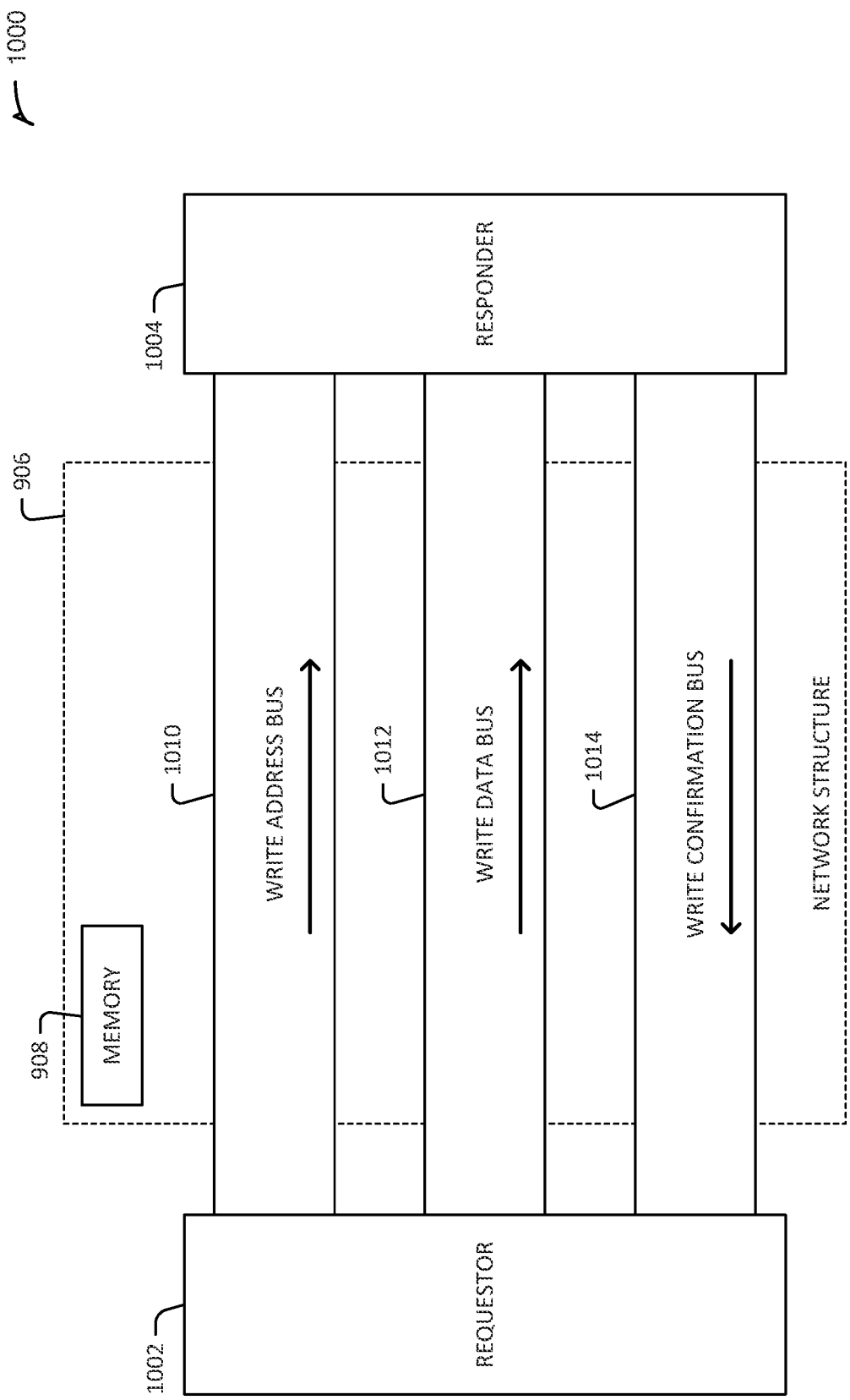
FIG. 10 illustrates an example arrangement including a write request made by a requestor hardware compute element to a responder hardware compute element via a network structure.

FIG. 10 illustrates an example arrangement 1000 including a write request made by a requestor hardware compute element 1002 to a responder hardware compute element 1004 via the network structure 906. The requestor compute element 1002 and responder compute element 1004 may be any suitable compute elements, as described herein.

In the example arrangement 1000, the requestor compute element 1002 provides write control data to the responder compute element 1004 via a write address bus 1010 provided by the network structure 906. The write control data may comprise, for example, an address or other indicator of the responder compute element 1004 and, in some examples, may include an indication of where data is to be written. In response to receiving the write control data, the network structure 906 switches to a state that provides the write address bus 1010 between the requestor compute element 1002 and the responder compute element 1004. The write address bus 1010 may comprise a predetermined number of channels, as described herein.

The requestor compute element 1002 may also provide write data to the responder compute element 1004. The network structure 906 may be switched to a state that provides the write data bus 1012 between the requestor compute element 1002 and the responder compute element 1004 to facilitate the provision of the write data to the responder compute element 1004.

Upon writing the write data, the responder compute element 1004 may provide confirmation data to the requestor compute element 1002. The network structure 906 may be switched to a state that provides the write confirmation bus 1014 between the responder compute element 1004 and the requestor element 1002 and the responder compute element 1004 may provide the confirmation data to the requestor compute element 1002 via the write confirmation bus 1014 provided by the network structure 906. The write confirmation data may be part of write confirmation data provided via the write confirmation bus 1014.

The network structure 906 may store state data for the write request arrangement shown in FIG. 10. For example, when the network structure 906 receives a write request, it may store state data describing the write request. The state data may include, for example, an indication of the requestor compute element 1002, an indication of the responder compute element 1004, and an indication of the state of completion of the write request. This may include, for example, an indication of whether write control data has been provided to the responder compute element 1004, whether write data has been provided to the responder compute element 1004, and whether the write confirmation data has been provided to the requestor compute element 1002. When the write confirmation data is provided to the requestor compute element 1002, the network structure 906 may close the write request, for example, by clearing the state data for the write request from the memory 908.

Figure 11:
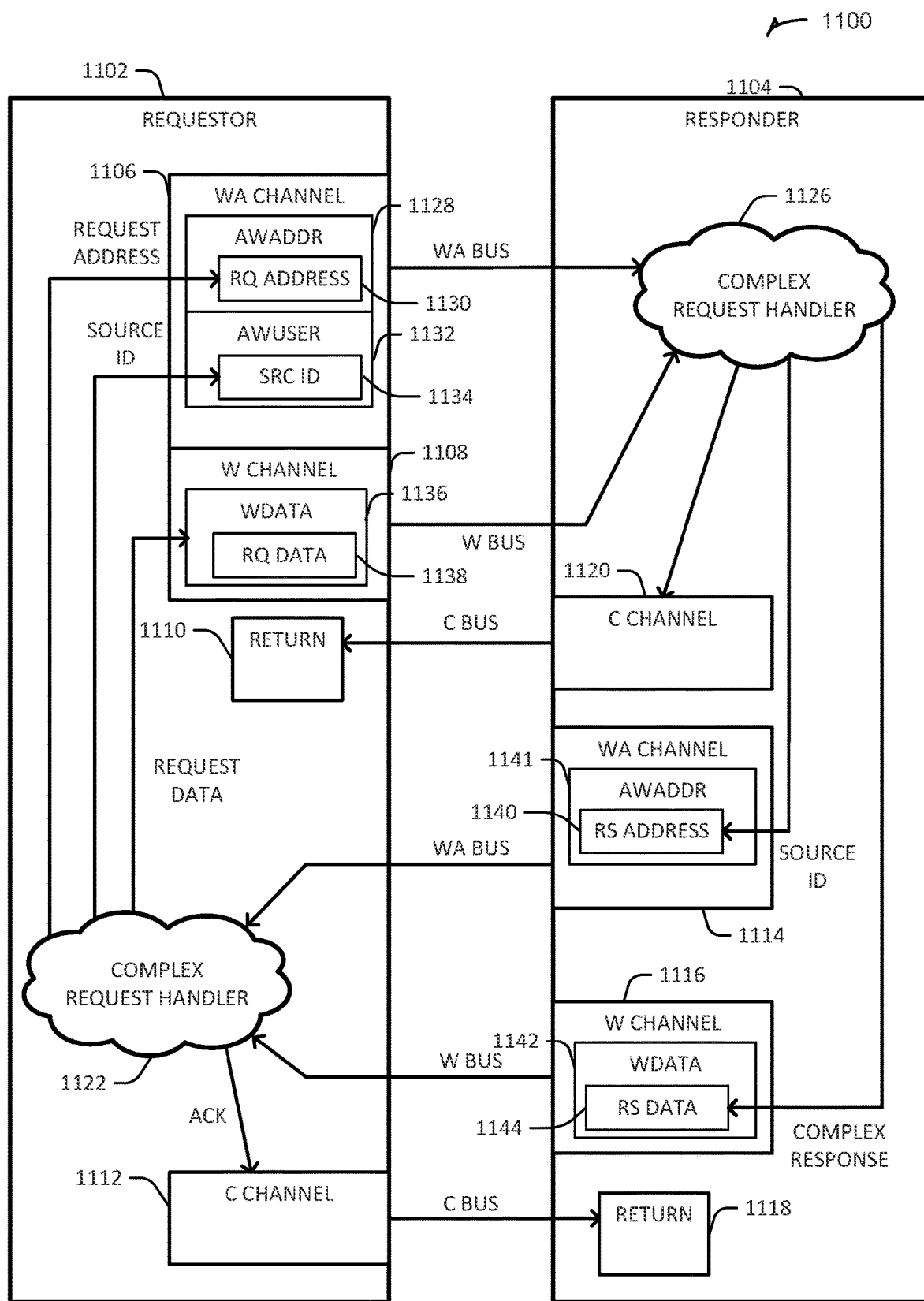
FIG. 11 is a diagram showing one example of an environment that may be implemented in a compute-near-memory (CNM) system, such as the CNM system of FIG. 1, to implement communication techniques including a multiple request transaction between a requestor hardware compute element and a responder hardware compute element.

Various examples utilize multiple communication requests to minimize the number of open communication requests at various network structures at any given time. FIG. 11 is a diagram showing one example of an environment 1100 that may be implemented in a CNM system, such as the CNM system 102 of FIG. 1, to implement communication techniques including a multiple request transaction between a requestor hardware compute element 1102 and a responder hardware compute element 1104. The example transaction illustrated by FIG. 11 utilizes write requests and corresponding busses, such as the write request and busses described herein with respect to FIG. 10.

In the example of FIG. 11, the requestor compute element 1102 comprises various channels, including a write address channel 1106, a write data channel 1108, and a write confirmation channel 1112. Similarly, the responder compute element 1104 comprises a write address channel 1114, a write data channel 1116, and a confirmation channel 1120. Channels 1106, 1108, 1112, 1114, 1116 may be data paths including, for example, wires, busses, registers, and/or other similar hardware arranged to transmit data across one or more busses provided by a network structure, as described herein. The hardware compute elements 1102, 1104 also include respective complex request handlers 1122, 1126. Complex request handlers 1122, 1126 may be dedicated hardware at the respective compute elements 1102, 1104 such as, for example, registers, microcontrollers, memory, and/or the like. In an example, the complex request handlers 1122, 1126 may be or include software executed by a processor, microcontroller, and/or other component of the respective compute elements 1102, 1104 to handle multiple-request transactions as described herein.

The requestor compute element 1102 may initiate a request for the responder compute element 1104 to perform a processing task. The processing task may be any suitable processing task to be performed and/or managed by the responder compute element 1104. In some examples, the processing task is a write. For example, the requestor compute element 1102 may provide data to be written to a memory at the CNM system. The responder compute element 1104 may be, for example, a memory controller, hardware balancer element, or other suitable compute element for writing data. In various examples, the processing task may be other than a write request. For example, the processing task may include data manipulation, such as transform computations, operations in neural networks or AI, operations in financial analytics, simulations and/or the like. For example, the requestor compute element 1102 may send a write request indicating a processing task when the requestor compute element 1102 determines that it is not best suited to execute the processing task and/or determines that another hardware compute element may be better suited to execute the processing task. For example, the processing task may involve operating on data stored at a memory that is remote from the requestor compute element 1102 and/or potentially closer to another hardware compute element.

The requestor compute element 1102 may request performance of the processing task by initiating a first write request to the responder compute element 1104 via a network structure. The complex request handler 1122 may provide request address data 1130 and source identifier data 1134 at the write address channel and request data 1138 at the write channel 1108. The request address data 1130 may indicate an address or other identifier of the responder compute element 1104. The source identifier data 1134 may describe the requestor compute element 1102. The source identifier data 1134 may be used by the responder compute element 1104 to direct a second write request upon completion of the processing task, as described herein. The request data 1138 may describe the processing task to be performed and, in some examples, may include data for use in performing the processing task. For example, when the processing task is a write request, the request data 1138 may indicate the write request and may include data to be written. In an example, the request data may describe the processing task and include a reference to data for use in the processing task that is stored at another position in the CNM system.

The complex request handler 1122 may load the request address data 1130 and source identifier data 1134 to respective subchannels 1128, 1132 of the write address channel 1106. The subchannel 1128 may be a subchannel for receiving a request address. The subchannel 1132 may be a subchannel that is used by the relevant protocol, such as AXI, for other data such as user-defined data. In an example, the subchannel 1128 corresponds to the AWADDR channel and the subchannel 1132 corresponds to the AWUSER channel from the AXI protocol. In an example, the request data 1138 is loaded to a write data (WDATA) subchannel 1136.

A network structure (not shown in FIG. 11) may provide a write address bus (WABUS) and write data bus (W bus) between the requestor compute element 1102 and the responder compute element 1104. The requestor may provide the request address data 1130 and source identifier data 1134 to the responder compute element 1104 via the write address bus WA BUS.

The complex request handler 1126 at the responder compute element 1104 receives the request address data 1130, source identifier data 1134, and request data 1138. Before performing or acting on the processing task indicated by the request data 1138, the responder compute element 1104 (e.g., a return circuit 1118 thereof) may load confirmation data to a confirmation channel 1120. The network structure may provide a write confirmation bus (C BUS) by which the responder compute element 1104 provides the confirmation data to the requestor compute element 1102. Upon providing the write confirmation bus C BUS and determining that the confirmation data has been sent, the network structure may close the first write request initiated by the requestor compute element 1102. The requestor compute element 1102 may comprise a return channel 1110 that receives the confirmation data via the write confirmation bus C BUS.

The complex request handler 1126 may facilitate execution of the processing task. For example, depending on the nature of the processing task, the responder compute element 1104 may execute the processing task and/or send it to another hardware compute element. For example, the responder compute element 1104 may be a hardware balancer element, as described herein, and may send the processing task to another compute element.

The complex request handler 1126 may determine when the requested processing task is completed. This may occur, for example, when the responder compute element 1104 completes the processing task and/or when the responder compute element 1104 receives a message from another hardware compute element indicating that the processing task has been completed.

Upon completion of the processing task, the complex request handler 1126 may initiate a second write request directed towards the requestor compute element 1102. The complex request handler 1126 may load response address data 1140 to the write address channel 1114, e.g., to an AWADDR subchannel 1141. The response address data 1140 may indicate an address or other data identifying the requestor compute element 1102. The response address data may be and/or may be based on the source identifier data 1134 provided by the requestor compute element 1102. The complex request handler 1126 may also write response data 1144 to the write channel 1116 (e.g., the write data WDATA subchannel 1142). The response data 1144 may indicate that the requested processing task has been completed. The network structure may provide a write address bus WA BUS that provides the response address data to the requestor compute element 1102 and a write bus W BUS that provides the response data 1144 to the requestor compute element 1102. Upon receiving the second write request (e.g., the response address data 1140 and/or the response data 1144), the requestor compute element 1102 may provide confirmation data to the responder compute element 1104. For example, the complex request handler 1122 may load the confirmation data to the confirmation channel 1112 where it may be conveyed via a write confirmation bus C BUS provided by the network structure between the requestor compute element 1102 and the responder compute element 1104.

Although the complex request handler 1122 of FIG. 11 is shown as a single component, some examples may split the logic of this components. For example, a request handler component of the complex request handler 1122 may load data to the respective channels 1106, 1108. A response handler component of the complex request handler 1122 may receive the write request including response address data 1140 and response data 1144 and provide the confirmation data via the confirmation bus. In some examples, the complex request handler 1126 may be similarly broken into constituent functional components.

Figure 12:
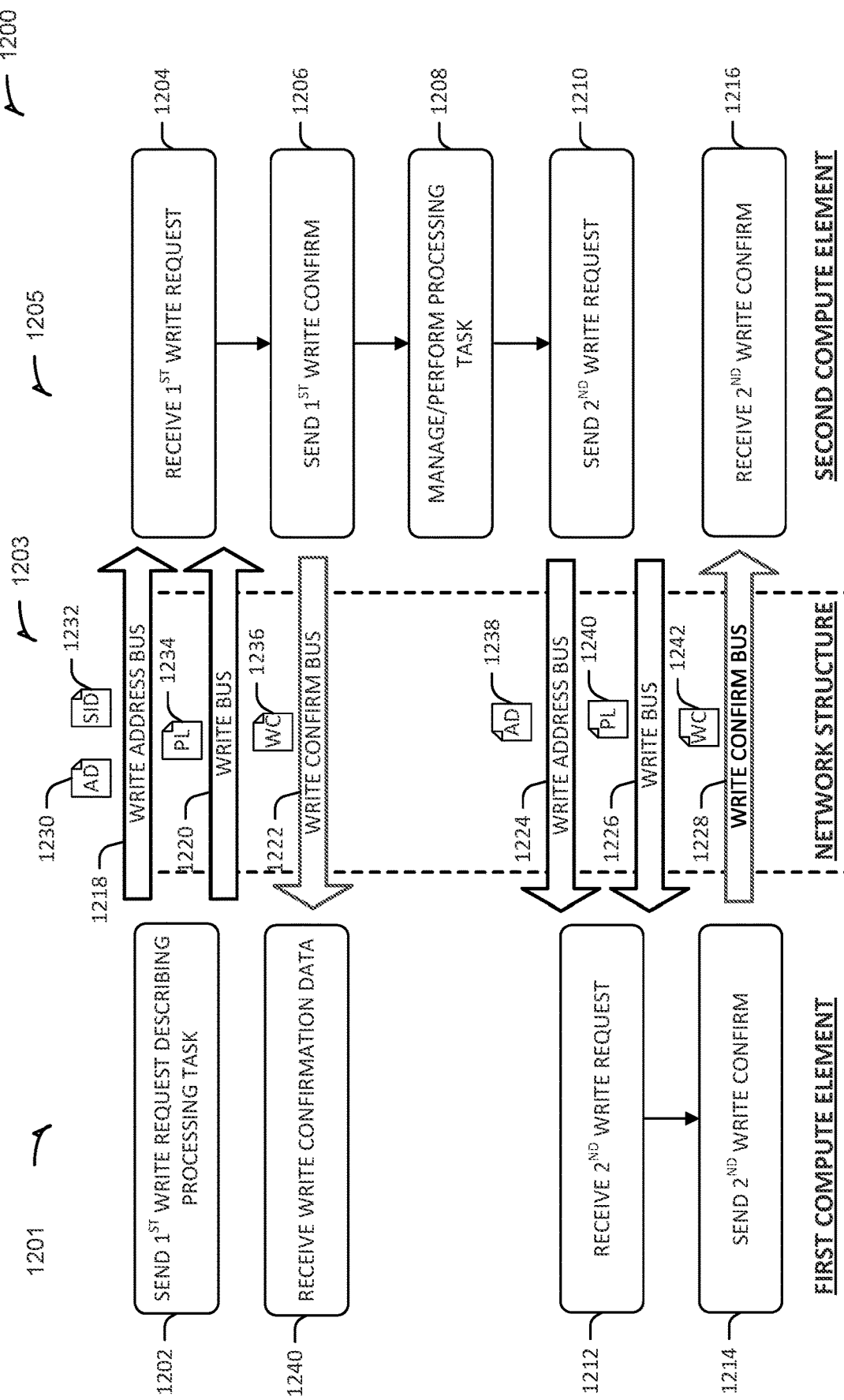
FIG. 12 is a flowchart showing one example of a process flow that may be executed, for example, in the environment of FIG. 11 to implement a multiple request transaction.

FIG. 12 is a flowchart showing one example of a process flow 1200 that may be executed, for example, in the environment 1100 of FIG. 11 to implement a multiple request transaction. The process flow 1200 includes three columns 1201, 1203, 1205. The column 1201 comprises operations that are executed by a first hardware compute element, which may be a requestor compute element similar to the requestor compute element 1102 of FIG. 11. The column 1203 includes operations executed by a network structure. The column 1205 includes operations executed by a second hardware compute element, which may be a responder compute element similar to the responder compute element 1104 of FIG. 11.

At operation 1202, the first compute element sends a first write request to the second compute element via the network structure. Sending the first write request may comprise sending address data 1230 and source identifier data 1232 to the second compute element via a write address bus 1218 provided by the network structure. The address data 1230 may indicate an address or other identifier of the second compute element. The source identifier data 1232 may indicate an address or other identifier of the first compute element. In some examples, the address data and source ID data may be provided via different subchannels of the write address bus 1218, as described herein. Sending the first write request may also comprise sending payload data 1234. The payload data 1234 may describe a processing task that is to be performed and/or managed by the second compute element. The payload data 1234 may be provided to the second compute element via a write data bus 1220 provided by the network structure.

The second compute element receives the first write request at operation 1204. At operation 1206, the second compute element sends write confirmation data 1236 to the first compute element via a write confirmation bus 1222 provided by the network structure. The write confirmation data 1236 may be provided before the requested processing task is completed. In response to the write confirmation data 1236, the network structure may close the first write request, for example, by deleting state data describing the first write request and thereby freeing resources at the network structure for use by other requests. The first compute element may receive the write conformation data 1236 at operation 1240.

At operation 1208, the second compute element may perform and/or manage the performance of the requested processing task. In some examples, the second compute element may perform the requested processing task. In another example, the second compute element may request that another hardware compute element perform the processing task. For example, the second compute element may send a write request to the other hardware compute element similar to the first write request sent by the first compute element at operation 1202. The second compute element may determine that the processing task is complete, for example, after the second compute element has completed the processing task and/or when the second compute element has received a message indicating that another compute element or compute elements have completed the processing task.

Upon completion of the processing task, the second compute element sends a second write request to the first compute element at operation 1210. The second write request may comprise address data 1238 describing the address or other identifier of the first compute element. For example, the address data 1238 may be and/or be derived from the source identifier data 1232 provided with the first write request. The address data 1238 may be provided to the first compute element via a write address bus 1224 provided by the network structure. The second write request may also comprise payload data 1240 that is provided to the first compute element via a write data bus 1226 provided by the network structure. The payload data 1240 may comprise an indication that the processing task is completed.

The first compute element may receive the second write request at operation 1212 and, at operation 1214 may send second write confirmation data 1242 to the second compute element. The second compute element receives the second write request at operation 1216. The second write confirmation data 1242 may be provided to the second compute element via a write confirmation bus 1228 provided by the network structure. In response to the second write confirmation data 1242, the network data structure may close the second write request, for example, by clearing state data for the second write request.

Figure 13:
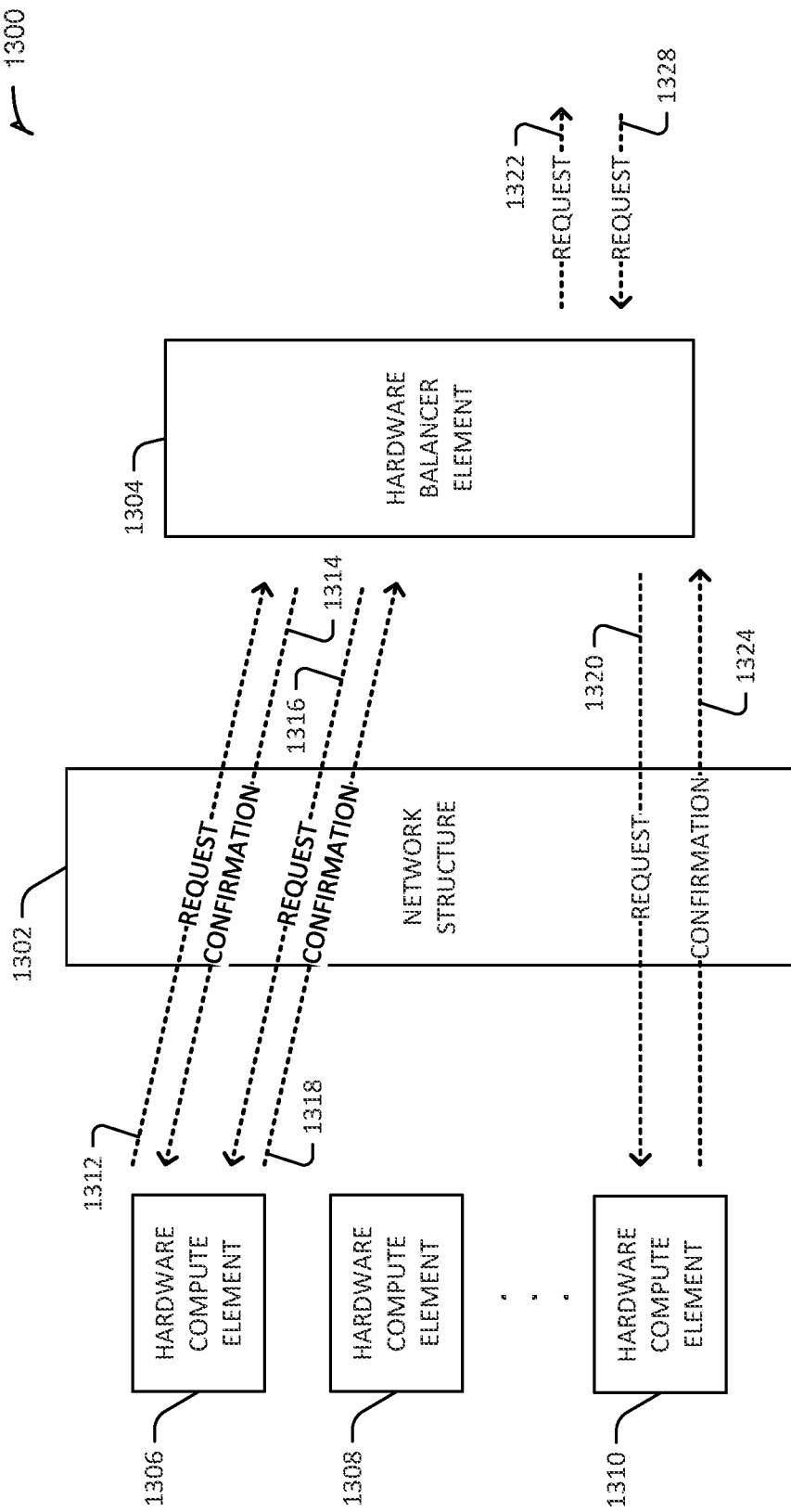
FIG. 13 is a diagram showing one example of an environment that may be implemented in a CNM system, such as the CNM system of FIG. 1, to implement communication techniques as described herein.

FIG. 13 is a diagram showing one example of an environment 1300 that may be implemented in a CNM system, such as the CNM system 102 of FIG. 1, to implement communication techniques as described herein. The environment 1300 includes a network structure 1302, a hardware balancer element 1304, and various hardware processing elements 1306, 1308, 1310. The network structure 1302 may be a hardware component or combination of components that connect hardware compute elements, such as hardware compute elements 1304, 1306, 1308, 1310. Referring to the example of FIG. 1, the scale fabric 106, the first switch 110, and the NOC 118 may make up all or part of a network structure such as the network structure 1302.

The compute elements 1306, 1308, 1310 may be or include any suitable hardware element that performs and/or requests a processing task. Using the example of FIGS. 1-8, the hardware compute elements 1306, 1308, 1310 may be or include, for example, components of an HTP 140, elements of an HTF 142, a memory controller 130, and/or the like. The balancer element 1304 is a hardware compute element that directs messages and/or processing tasks to different compute elements. Referring again to the example of FIG. 1, the HID 120 may serve as a balancer element for requests from compute elements at the HTP 140, HTF 142, memory controllers 130 and/or other components of the memory device 112. Also, for example, the host system 108 may serve as a balancer element for compute elements at the various memory devices 112.

In the example of FIG. 13, the compute element 1306 directs a request message 1312 to the balancer element 1304 via the network structure 1302. For example, the network structure 1302 may selectively provide one or more busses between the hardware compute element 1306 and the hardware balancer element 1304, as described herein. The request message 1312 may be a write request message. The network structure 1302 may store state data describing the request message 1312. The request message 1312 includes payload data describing a processing task that is to be performed by a compute element different than the compute element 1306. The compute element 1306 may request the processing task, for example, after determining that another compute element may be more suitable to execute the processing task. In an example, the processing task may involve using data stored at a memory that is not near the compute element 1306. In another example, the processing task may be more efficiently performed by a different compute element. In some examples, the request message also includes source identifier data describing the hardware compute element 1306.

The request message 1312 may be arranged according to any suitable communication protocol. In some examples, the balancer element 1304 and compute elements 1306, 1308, 1310 may communicate according to the AXI format, the CXL format, and/or another suitable format. In an example, the request message 1312 is arranged as an AXI request message and/or as a CXL request message.

Upon receiving the request message, the balancer element 1304 may direct a confirmation data 1314 back to the requestor compute element 1306. The confirmation data 1314 may be sent before balancer element 1304 has received an indication that the payload of the request message 1312 has been delivered to its ultimate receiver party and/or whether the processing task has been executed. The sending of the confirmation data 1314, in some examples, may prompt the network structure 1302 to clear or close the request message 1312, for example, by clearing the state data at the network structure 1302 related to the request message 1312.

The balancer element 1304 may also direct a new request message 1320 or 1322 to request execution of the processing task indicated by the request message 1312. In an example, the balancer element 1304 determines that the processing task should be performed by one of the local compute elements 1306, 1308, 1310 that are near to the balancer element 1304 at the CMN system. For example, if the HID 120 of FIG. 1 is the balancer element 1304 and the request message 1312 is received from a component of the HTP 140 or HTF 142 at a memory device 112, the HID 120 may determine that the requested processing task is to be performed by a different component of the HTP 140 or HTF 142 at the memory device 112.

When the balancer element 1304 selects a local compute element 1306, 1308, 1310 to perform the requested processing task, it may direct a request message 1320 to the selected compute element, where the selected compute element is the ultimate responder compute element. In the example of FIG. 13, the balancer element 1304 selects the compute element 1310 and the request message 1320 is directed to the compute element 1310. In an example, the request message 1320 describes the processing task described by the hardware compute element 1306 via the request message 1312 and may request that the compute element 1310 execute the processing task. In some examples, the request message 1320 also includes source identifier data indicating the hardware balancer element 1304.

The compute element 1310 may credit the request message 1320 by sending a confirmation data 1324 to the balancer element 1304. The confirmation data 1324 may indicate that the request message 1320 was received. In some examples, the confirmation data 1324 may indicate that the compute element 1310 has accepted (and will perform) the processing task. In some examples, the compute element 1310 will execute the processing task before sending the confirmation data 1324. In other examples, the hardware compute element 1310 will send the confirmation data 1324 before executing the processing task. Upon completing the processing task, the hardware compute element 1310 may send an additional request message (not shown) to the hardware balancer element 1304 to indicate completion of the processing task.

Upon processing the confirmation data, the network structure 1302 may clear state data regarding the request message 1320. The balancer element 1304, upon receiving an indication that the processing task is complete, may send a request message 1316 to the requesting compute element 1306. The request message 1316 may convey payload data indicating a status of the processing task. For example, the request message 1316 may indicate that the processing task has been successfully assigned to the responder compute element 1310 and/or is complete. In this way, the request message 1316 may provide the requestor compute element 1306 credit information indicating that the original request message 1312 has been delivered to its destination and/or that the requested processing task has been completed. In this way, the compute element 1306 may receive "end-to-end" credit of its original request message 1312 without holding the request message 1312 open at the network structure 1302. Upon receiving the request message 1316, the requesting compute element may send a confirmation data 1318 which may prompt the network structure 1302 to close state data stored for the request message 1316.

In another example, the balancer element 1304 may determine that the processing task described by the request message 1312 is to be performed by a compute element at a different part of the CNM (e.g., at a different memory device, at a different node, etc.). In this example, the balancer element 1304 may direct a request message 1322 to another balancer element at a different portion of the CNM system. For example, if the balancer element 1304 is an HID 120 at a memory device 112, it may send a request message 1320 to another HID 120 at a different memory device, to a host system 108 of a different node 104 and/or the like. The element that receives the request message 1322 may direct a request message (not shown) to a responder compute element and/or to another intermediate balancer element. This may continue until a request message describing the requested processing task is provided to a responder compute element. Upon accepting and/or completing the processing task, the responder compute element may send a request message indicating the completion. The balancer element 1304 may receive a request message 1328 indicating that the receive compute element has completed the requested processing task. The request message 1328 may be received directly from the responder compute element and/or from an intermediate balancer element. Upon receiving the request message 1328 indicating completion of the processing task, the balancer element 1304 may initiate the request message 1316 and confirmation data 1318 pair as described herein.

In the example of FIG. 13, the request message 1320 and/or the request message 1322 sent by the balancer element 1304 may be sent before the responder compute element (e.g., compute element 1310 or another computer element) credits the original message by accepting the processing task and/or completing the processing task. For example, the request message 1320 and/or the request message 1322 may be sent before the balancer element 1304 receives the confirmation data 1324 and/or the request message 1328 indicating completion of the requested processing task.

In the example arrangement of FIG. 13, state data stored by the network structure 1302 may be closed upon receipt of the confirmation data 1314, 1318, 1324. This may free resources of the network structure 1302 to receive and/or process other messages while the original request for the processing task is pending. Also, in some examples, a similar technique may be used with respect to the request messages 1322, 1328 across another network structure or structures (not shown in FIG. 13). For example, the balancer element that receives the request message 1322 may direct a confirmation data (not shown) to the balancer element 1304, thereby freeing the network structure or structures between the balancer element 1304 and the balancer element that receives the request message 1322 to handle other messages. Similarly, the balancer element may direct a confirmation data (not shown) to close the request message 1328. In this way, the original requestor compute element 1306 may receive an end-to-end credit indicating the receipt and/or completion of the assigned processing task without holding open the original request message 1312 at the network structure 1302.

Figure 14:
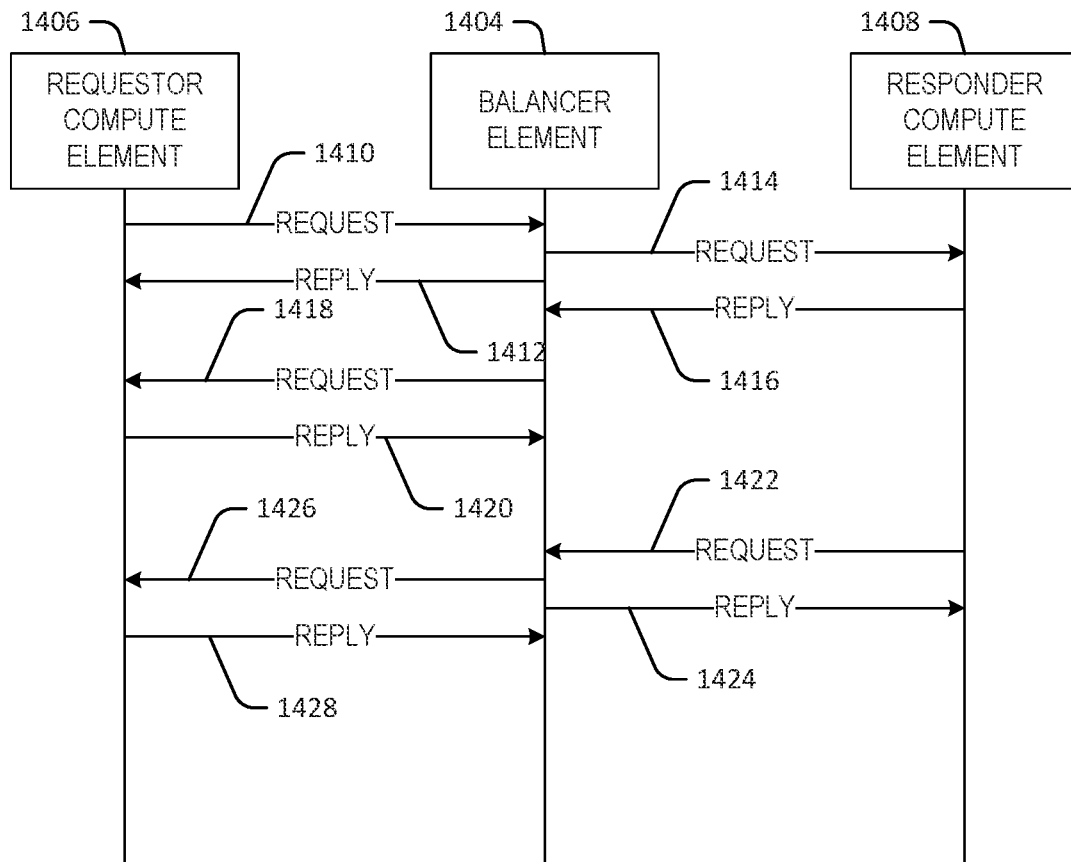
FIG. 14 is a diagram showing one example set of communications between a requestor compute element, a balancer element and a receiver.

FIG. 14 is a diagram 1400 showing one example set of communications between a requestor compute element 1406, a balancer element 1404 and a responder compute element 1408. The requestor compute element 1406 may be a compute element that requests performance of a processing task, for example, as described herein. The balancer element 1404 may be a balancer element, as described herein, that is in communication with the requestor compute element 1406 and the responder compute element 1408, for example via a common network structure.

The requestor compute element 1406 directs a request message 1410 to the balancer element 1404. The request message 1410 may describe a processing task to be performed by another compute element (e.g., other than the requestor compute element 1406). The balancer element 1404 directs a reply message 1412 including confirmation data to the requestor compute element 1406. The confirmation data may prompt the network structure conveying the messages 1410, 1412 to clear the request message 1410, for example, by closing state data associated with the request message 1410, thus freeing the network structure to handle additional request messages.

The balancer element 1404 may select a compute element to perform the processing task indicated by the request message 1410. In this example, the balancer element 1404 selects the responder compute element 1408. The responder compute element 1408 may be a compute element and/or another balancer element that is in communication with the balancer element 1404 via the same network structure as the requestor compute element 1406 and/or by a different network structure. The balancer element 1404 directs a request message 1414 to the responder compute element 1408. In response to the request message 1414, the responder compute element 1408 may send a confirmation data 1416 to the balancer element 1404. This may prompt the network structure handling the request message 1414 to clear the request message 1414.

In an example, the balancer element 1404 directs a request message 1418 to the requestor compute element 1406. The request message 1418 may indicate that the request message 1410 has been passed to the responder compute element 1408 (e.g., via the request message 1414). The requestor compute element 1406 may respond to the request message 1418 with a confirmation data 1420, which may prompt the network structure to clear the request message 1418.

Upon accepting and/or executing the processing task, the responder compute element 1408 may send a request message 1422 to the balancer element 1404. The request message 1422 may comprise data indicating that the processing task has been accepted and/or completed by the responder compute element 1408. The balancer element 1404 may respond to the request message 1422 by sending a confirmation data 1424 to the responder compute element 1408. This may prompt the network structure handling the request message 1422 to close the state data for the request message 1422.

The balancer element 1404 may also send a request message 1426 to the requestor compute element 1406. The request message 1426 may indicate to the requestor compute element 1406 that the processing task is accepted and/or completed. The requestor compute element 1406 may send a confirmation data 1428 to the balancer element 1404. The network structure conveying the request message 1426 may close the state data stored in response to the request message 1426. In this way, the requestor compute element 1406 may receive end-to-end credit indicating that the request message 1410 has been received and accepted by the end recipient (e.g., the responder compute element 1408) without keeping the request message 1410 open at the network structure until the credit is received.

Figure 15:
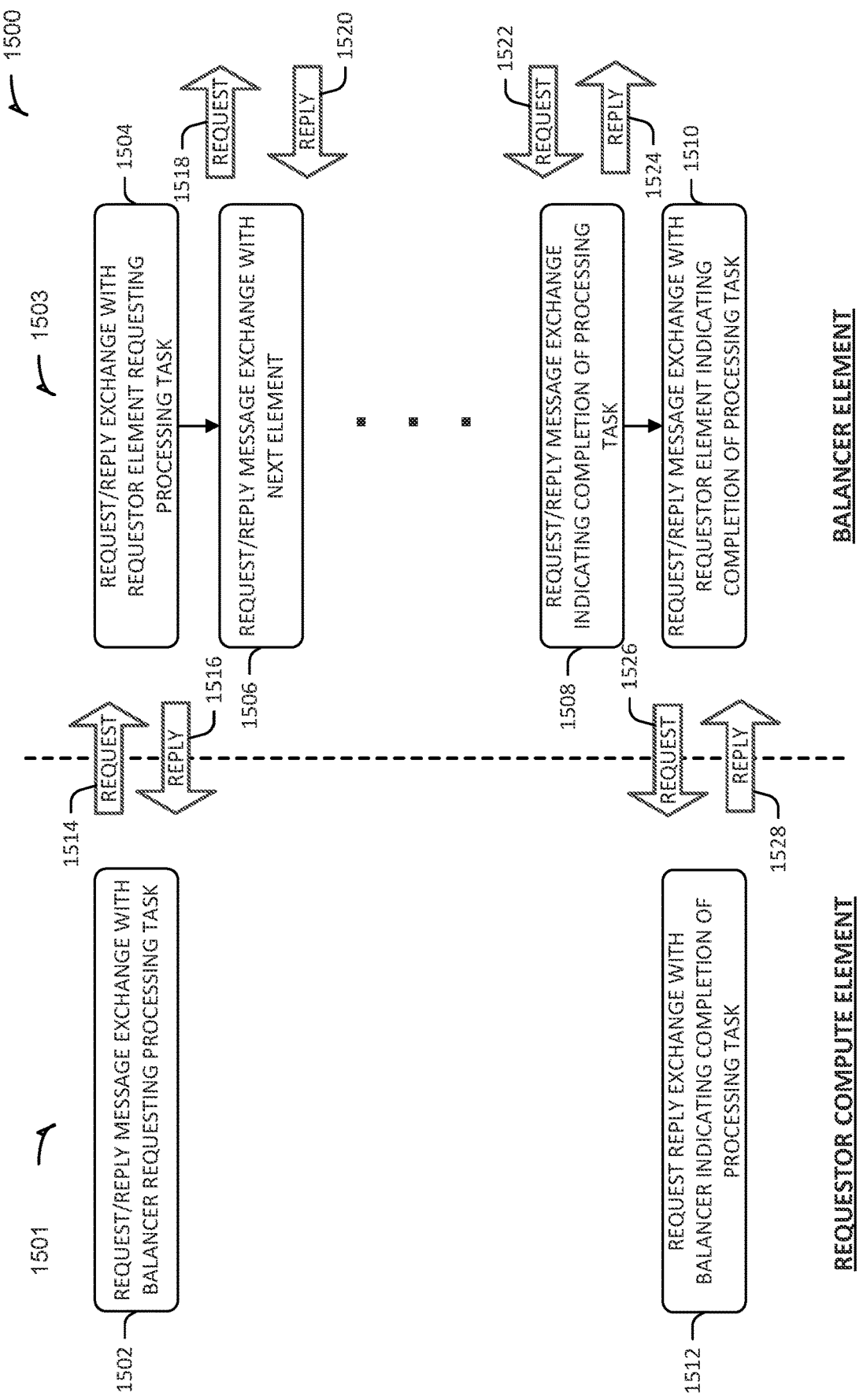
FIG. 15 is a flowchart showing one example of a process flow that may be execute in a CNM system, for example, between a requestor compute element and a balancer element.

FIG. 15 is a flowchart showing one example of a process flow 1500 that may be executed in a CNM system, for example, between a requestor compute element and a balancer element. The process flow 1500 includes two columns 1501, 1503. The column 1501 includes operations performed by a requestor compute element, such as the requestor compute element 1406 of FIG. 14 or the compute element 1306 of FIG. 13. The column 1503 includes operations performed by a balancer element, such as the balancer element 1304 of FIG. 13 or the balancer element 1404 of FIG. 14.

At operation 1502, the requestor compute element sends a request message 1514 to the balancer element and receives a reply message 1516 that may include confirmation data. At operation 1504, the balancer element receives the request message 1514 and sends the reply message 1516. The request message 1514 may describe a processing task to be performed by a compute element (e.g., a compute element different than the requestor compute element). Upon receiving the request message 1514, the balancer element sends the reply message 1516, for example, to prompt the network structure handling the messages 1514, 1516 to clear the request message 1514, thereby freeing network structure resources for other requests.

At operation 1506, the balancer element performs a request/confirmation data exchange with a next element. The request/confirmation data exchange may include the balancer element sending a request message 1518 to the next element and receiving a reply message 1520 from the next element. The reply message 1520 may include confirmation data. The request message 1518 may describe the processing task. The request message 1518 and reply message 1520 may be sent via the same network structure that handled the messages 1514, 1516 and/or by a different network structure. The sending of the reply message 1520 by the next element may prompt the network structure handling the messages 1518, 1520 to clear the request message 1518, for example, by clearing the state data for the request message 1518.

In some examples, the next element is a compute element to perform the processing task, for example, as described in FIGS. 13 and 14. For example, the balancer element may select the compute element to perform the processing task. Also, in some examples, the next element is another balancer element. The other balancer element may direct a request message (not shown) to a compute element or still another balancer element, as described herein.

At operation 1508, the balancer element performs another request/confirmation data exchange with the next element. A request message 1522 may be received from the next element and may credit the original request message 1514 sent by the requestor compute element. For example, the request message 1522 may indicate that a responder compute element has accepted and/or completed the processing task. The balancer element sends a reply message 1524 to the next element to prompt the network structure handling the messages 1522, 1524 to clear the request message 1522, thereby freeing network structure resources to handle other messages.

The balancer element, at operation 1510 performs a request/confirmation data exchange with the requestor compute element. The request message 1526, received by the requestor compute element at operation 1512, indicates that the processing task is completed. The requestor compute element, at operation 1512, sends the reply message 1528 to the balancer element, for example, to prompt the network structure handling the messages 1526, 1528 to clear the request message 1526.

Figure 16:
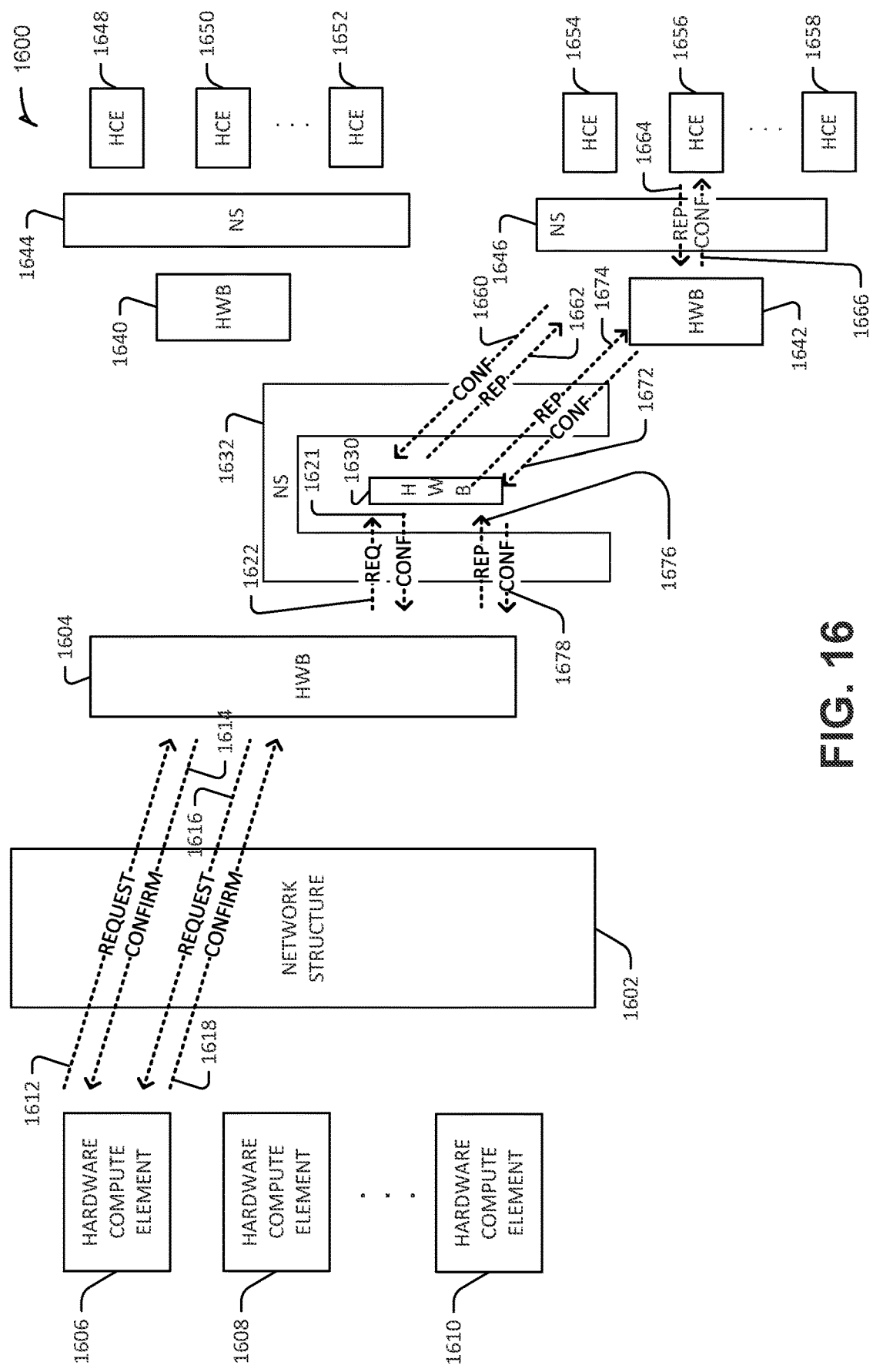
FIG. 16 is a diagram showing one example of a CNM environment illustrating a request and confirmation data exchanges at multiple locations of the CNM.

FIG. 16 is a diagram showing one example of a CNM environment 1600 illustrating a request and confirmation data exchange at multiple locations of the CNM. The CNM environment 1600 includes compute elements 1606, 1608, 1610 in communication with a balancer element 1604 via a network structure 1602. For example, the compute elements 1606, 1608, 1610 may be or include components of an HTP 140 or HTF 142 of FIG. 1, the network structure 1602 may be or include the NOC 118 of FIG. 1 and the balancer element 1604 may be or include the HID 120 of FIG. 1. FIG. 16 also shows a balancer element 1630 in communication with the balancer element 1604 via a network structure 1632. For example, the balancer element 1630 may be or include the switch 110 of FIG. 1. The balancer element 1630 may also be in communication with balancer elements 1640, 1642 via the network structure 1632. The balancer elements 1640, 1642 may be in communication with respective sets of compute elements 1648, 1650, 1652, 1654, 1656, 1658 via respective network structures 1644, 1646. In some examples, the balancer elements 1640, 1642 may be or include HID components at other memory devices at the node 104, the network structures 1644, 1646 may be NOCs at other memory devices at the node 104, and compute elements 1648, 1650, 1652, 1654, 1656, 1658 may be HTP or HTF elements at other memory devices at the node 104.

In the example of FIG. 16, the compute element 1606 is a requestor compute element and sends a request message 1612 to the balancer element 1604 via the network structure 1602. The request message 1612 may include a description of a processing task to be performed at another compute element. The balancer element 1604 receives the request message 1612 and sends a confirmation data 1614 to the compute element 1606. The sending of the confirmation data 1614 may prompt the network structure 1602 to clear the request message 1612, for example, by closing state data on the request message 1612.

In this example, the balancer element 1604 determines that the processing task is to be performed by a compute element at a different location in the CNM environment 1600 (e.g., not by one of the other compute elements 1608, 1610 in communication with the balancer element 1604 via the network structure 1602). Accordingly, the balancer element 1604 sends a request message 1622 to the balancer element 1630 via the network structure 1632. The request message 1622 may describe the processing task. The balancer element 1630 may send a confirmation data 1621 to the balancer element 1604. The confirmation data 1621 may prompt the network structure 1632 to clear the request message 1622, thereby freeing resources at the network structure 1632 to handle additional messages.

The balancer element 1630 may select the balancer element 1642 to determine a compute element to perform the processing task. The balancer element 1642 sends a request message 1660 to the balancer element 1642 via the network structure 1632. The request message 1662 may describe the processing task. The balancer element 1642 may send a confirmation data 1660 to the balancer element 1630. The confirmation data 1660 may prompt the network structure 1632 to clear the request message 1662, thereby freeing resources at the network structure 1632 to handle additional messages.

The balancer element 1642 may select a compute element to execute the processing task. In this example, the balancer element 1642 selects the compute element 1656, which may be referred to as the receiver or responder compute element. The balancer element 1642 sends a request message 1666 to the compute element 1656 via the network structure 1646. The request message 1666 describes the processing task. The compute element 1656 may perform the processing task. Upon accepting and/or completing the processing task, the compute element 1656 sends a confirmation data 1664 to the balancer element 1642 via the network structure 1646. The confirmation data 1664 may indicate that the processing task has been accepted and/or completed, thus crediting the original request message 1612. The balancer element 1642 may send a request message 1674 to the balancer element 1630 via the network structure 1632. The request message 1674 may indicate that the processing task is accepted and/or completed. The balancer element 1630 may send confirmation data 1672 to the balancer element 1642. The confirmation data 1672 may prompt the network structure 1632 to clear the request message 1674, thereby freeing resources at the network structure 1632 to handle additional messages.

The balancer element 1630 may send a request message 1676 to the balancer element 1604. The request message 1676 may indicate that the processing task is accepted and/or complete. The balancer element 1604 may send a confirmation data 1678 to the balancer element 1630. The confirmation data 1678 may prompt the network structure 1632 to clear the request message 1676, thereby freeing resources at the network structure 1632 to handle additional messages.

The balancer element 1604 may send a request message 1616 to the requestor compute element 1606. The request message 1616 may indicate that the processing task is accepted and/or completed, thereby crediting the original request message 1612. The requestor compute element 1606 may send a confirmation data 1618 to the balancer element 1604. The confirmation data 1618 may prompt the network structure 1632 to clear the request message 1616, thereby freeing resources at the network structure 1602 to handle additional messages.

Figure 17:
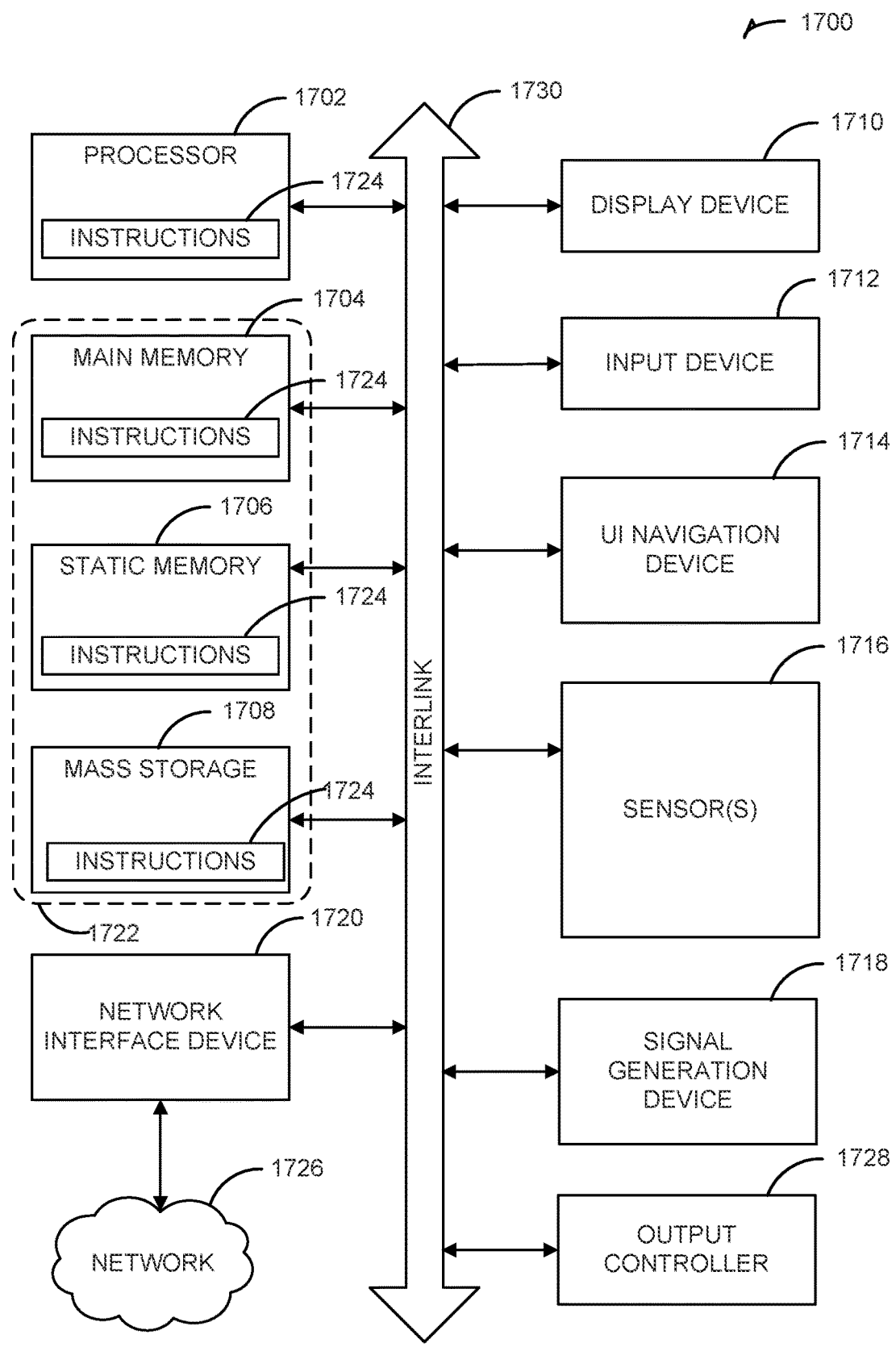
FIG. 17 illustrates a block diagram of an example machine with which, in which, or by which any one or more of the techniques (e.g., methodologies) discussed herein can be implemented.

FIG. 17 illustrates a block diagram of an example machine 1700 with which, in which, or by which any one or more of the techniques (e.g., methodologies) discussed herein can be implemented. Examples, as described herein, can include, or can operate by, logic or a number of components, or mechanisms in the machine 1700. Circuitry (e.g., processing circuitry) is a collection of circuits implemented in tangible entities of the machine 1700 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1700.

In alternative embodiments, the machine 1700 can operate as a standalone device or can be connected (e.g., networked) to other machines. In a networked deployment, the machine 1700 can operate in the capacity of a server machine, a client machine, or both in server-client network environments. In an example, the machine 1700 can act as a peer machine in peer-to-peer (P2P) (or other distributed) network environment. The machine 1700 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 1700 (e.g., computer system) can include a hardware processor 1702 (e.g., a central processing unit (CPU), a graphics processing unit (GPU), a hardware processor core, or any combination thereof), a main memory 1704, a static memory 1706 (e.g., memory or storage for firmware, microcode, a basic-input-output (BIOS), unified extensible firmware interface (UEFI), etc.), and mass storage device 1708 (e.g., hard drives, tape drives, flash storage, or other block devices) some or all of which can communicate with each other via an interlink 1730 (e.g., bus). The machine 1700 can further include a display device 1710, an alphanumeric input device 1712 (e.g., a keyboard), and a user interface (UI) navigation device 1714 (e.g., a mouse). In an example, the display device 1710, the input device 1712, and the UI navigation device 1714 can be a touch screen display. The machine 1700 can additionally include a mass storage device 1708 (e.g., a drive unit), a signal generation device 1718 (e.g., a speaker), a network interface device 1720, and one or more sensor(s) 1716, such as a global positioning system (GPS) sensor, compass, accelerometer, or other sensor. The machine 1700 can include an output controller 1728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 1702, the main memory 1704, the static memory 1706, or the mass storage device 1708 can be, or include, a machine-readable media 1722 on which is stored one or more sets of data structures or instructions 1724 (e.g., software) embodying or used by any one or more of the techniques or functions described herein. The instructions 1724 can also reside, completely or at least partially, within any of registers of the hardware processor 1702, the main memory 1704, the static memory 1706, or the mass storage device 1708 during execution thereof by the machine 1700. In an example, one or any combination of the hardware processor 1702, the main memory 1704, the static memory 1706, or the mass storage device 1708 can constitute the machine-readable media 1722. While the machine-readable media 1722 is illustrated as a single medium, the term "machine-readable medium" can include a single medium or multiple media (e.g., a centralized or distributed database, or associated caches and servers) configured to store the one or more instructions 1724.

The term "machine readable medium" can include any medium that is capable of storing, encoding, or carrying instructions for execution by the machine 1700 and that cause the machine 1700 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a set of multiple of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 1722 can be representative of the instructions 1724, such as instructions 1724 themselves or a format from which the instructions 1724 can be derived. This format from which the instructions 1724 can be derived can include source code, encoded instructions (e.g., in compressed or encrypted form), packaged instructions (e.g., split into multiple packages), or the like. The information representative of the instructions 1724 in the machine-readable media 1722 can be processed by processing circuitry into the instructions to implement any of the operations discussed herein. For example, deriving the instructions 1724 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1724.

In an example, the derivation of the instructions 1724 can include assembly, compilation, or interpretation of the information (e.g., by the processing circuitry) to create the instructions 1724 from some intermediate or preprocessed format provided by the machine-readable media 1722. The information, when provided in multiple parts, can be combined, unpacked, and modified to create the instructions 1724. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1724 can be further transmitted or received over a communications network 1726 using a transmission medium via the network interface device 1720 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1720 can include one or more physical jacks (e.g., Ethernet, coaxial, or phone jacks) or one or more antennas to connect to the network 1726. In an example, the network interface device 1720 can include a set of multiple of antennas to wirelessly communicate using at least one of single-input multiple-output (SIMO), multiple-input multiple-output (MIMO), or multiple-input single-output (MISO) techniques. The term "transmission medium" shall be taken to includes any intangible medium that is capable of storing, encoding or carrying instructions for execution by the machine 1700, and includes digital or analog communications signals or other intangible medium to facilitate communication of such software. A transmission medium is a machine readable medium.

To better illustrate the methods and apparatuses described herein, a non-limiting set of Example embodiments are set forth below as numerically identified Examples.

Example 1 is an apparatus comprising: a first hardware compute element, the first hardware compute element being programmed to perform operations comprising sending a first request message to a hardware balancer element, the first request message describing a processing task; and the hardware balancer element being programmed to perform operations comprising: sending a second request message towards a second hardware compute element for executing the processing task, the second request message also describing the processing task; sending, to the first compute element, a first reply message, the first reply message being in reply to the first request message; after sending the first reply message, receiving a first completion request message, the first completion request message indicating that the processing task is assigned; and sending, to the first hardware computing element, a second completion request message, the second completion request message indicating that the processing task is assigned.

In Example 2, the subject matter of Example 1 optionally includes the operations further comprising selecting the second hardware compute element by the hardware balancer element.

In Example 3, the subject matter of Example 2 optionally includes wherein sending the second request message towards the second hardware compute element comprises directing the second request message to the second hardware compute element.

In Example 4, the subject matter of any one or more of Examples 1-3 optionally includes wherein sending the second request message towards the second hardware compute element comprises sending the second request message to a second hardware balancer element, and wherein the first completion request message is received from the second hardware compute element.

In Example 5, the subject matter of Example 4 optionally includes the operations further comprising sending, by the hardware balancer element, a first completion reply message to the second hardware balancer element.

In Example 6, the subject matter of any one or more of Examples 4-5 optionally includes wherein the sending of the first request message is via a first network structure, the operations further comprising: sending, by the second hardware balancer element and to the second hardware compute element, a third request message describing the processing task, the third request message being sent via a second network structure different than the first network structure; and sending, by the second hardware compute element and to the second hardware balancer element, a third reply message indicating that the processing task is assigned.

In Example 7, the subject matter of Example 6 optionally includes the operations further comprising: responsive to the sending of the third request message, storing, by the second network structure, state data describing the third request message; and responsive to the sending of the first reply message, clearing the state data describing the third request message.

In Example 8, the subject matter of any one or more of Examples 4-7 optionally includes the operations further comprising selecting the second hardware compute element by the second hardware balancer element.

In Example 9, the subject matter of any one or more of Examples 1-8 optionally includes wherein the sending of the first request message is via a first network structure, the operations further comprising: responsive to the sending of the first request message, storing, by the first network structure, state data describing the first request message; and responsive to the sending of the first reply message, clearing the state data describing the first request message by the first network structure.

Example 10 is a method, comprising: sending, by a first hardware compute element, a first request message to a hardware balancer element, the first request message describing a processing task; sending, by the hardware balancer element, a second request message towards a second hardware compute element for executing the processing task, the second request message also describing the processing task; sending, by the hardware balancer element and to the first compute element, a first reply message, the first reply message being in reply to the first request message; after sending the first reply message, receiving, by the hardware balancer element, a first completion request message, the first completion request message indicating that the processing task is assigned; and sending, by the hardware balancer element and to the first hardware computing element, a second completion request message, the second completion request message indicating that the processing task is assigned.

In Example 11, the subject matter of Example 10 optionally includes the method further comprising selecting the second hardware compute element by the hardware balancer element.

In Example 12, the subject matter of Example 11 optionally includes wherein sending the second request message towards the second hardware compute element comprises directing the second request message to the second hardware compute element.

In Example 13, the subject matter of any one or more of Examples 10-12 optionally includes wherein sending the second request message towards the second hardware compute element comprises sending the second request message to a second hardware balancer element, and wherein the first completion request message is received from the second hardware compute element.

In Example 14, the subject matter of Example 13 optionally includes sending, by the hardware balancer element, a first completion reply message to the second hardware balancer element.

In Example 15, the subject matter of any one or more of Examples 13-14 optionally includes wherein the sending of the first request message is via a first network structure, the method further comprising: sending, by the second hardware balancer element and to the second hardware compute element, a third request message describing the processing task, the third request message being sent via a second network structure different than the first network structure; and sending, by the second hardware compute element and to the second hardware balancer element, a third reply message indicating that the processing task is assigned.

In Example 16, the subject matter of Example 15 optionally includes responsive to the sending of the third request message, storing, by the second network structure, state data describing the third request message; and responsive to the sending of the first reply message, clearing the state data describing the third request message.

In Example 17, the subject matter of any one or more of Examples 13-16 optionally includes selecting the second hardware compute element by the second hardware balancer element.

In Example 18, the subject matter of any one or more of Examples 10-17 optionally includes wherein the sending of the first request message is via a first network structure, the method further comprising: responsive to the sending of the first request message, storing, by the first network structure, state data describing the first request message; and responsive to the sending of the first reply message, clearing the state data describing the first request message by the first network structure.

Example 19 is at least one computer readable medium comprising instructions thereon that, when executed by at least one hardware component, cause the hardware component to perform operations comprising: sending, by a first hardware compute element, a first request message to a hardware balancer element, the first request message describing a processing task; sending, by the hardware balancer element, a second request message towards a second hardware compute element for executing the processing task, the second request message also describing the processing task; sending, by the hardware balancer element and to the first compute element, a first reply message, the first reply message being in reply to the first request message; after sending the first reply message, receiving, by the hardware balancer element, a first completion request message, the first completion request message indicating that the processing task is assigned; and sending, by the hardware balancer element and to the first hardware computing element, a second completion request message, the second completion request message indicating that the processing task is assigned.

In Example 20, the subject matter of Example 19 optionally includes the operations further comprising selecting the second hardware compute element by the hardware balancer element.

The above detailed description includes references to the accompanying drawings, which form a part of the detailed description. The drawings show, by way of illustration, specific embodiments in which the can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the inventive subject matter should be determined with reference to the appended claims, along with the full scope of equivalents to which such claims are entitled.

What is claimed is:

1. An apparatus comprising:
a first hardware compute element, the first hardware compute element being programmed to perform operations comprising sending a first request message to a hardware balancer element, the first request message describing a processing task; and the hardware balancer element being programmed to perform operations comprising:

sending a second request message towards a second hardware compute element for executing the processing task, the second request message also describing the processing task;

sending, to the first hardware compute element, a first reply message, the first reply message being in reply to the first request message;

after sending the first reply message, receiving a first completion request message, the first completion request message indicating that the processing task is assigned; and sending, to the first hardware compute element, a second completion request message, the second completion request message indicating that the processing task is assigned.

2. The apparatus of claim 1, the operations further comprising selecting the second hardware compute element by the hardware balancer element.

3. The apparatus of claim 2, wherein sending the second request message towards the second hardware compute element comprises directing the second request message to the second hardware compute element.

4. The apparatus of claim 1, wherein sending the second request message towards the second hardware compute element comprises sending the second request message to a second hardware balancer element, and wherein the first completion request message is received from the second hardware compute element.

5. The apparatus of claim 4, the operations further comprising sending, by the hardware balancer element, a first completion reply message to the second hardware balancer element.

6. The apparatus of claim 4, wherein the sending of the first request message is via a first network structure, the operations further comprising:

sending, by the second hardware balancer element and to the second hardware compute element, a third request message describing the processing task, the third request message being sent via a second network structure different than the first network structure; and sending, by the second hardware compute element and to the second hardware balancer element, a second reply message in reply to the third request message, the second reply message indicating that the processing task is assigned.

7. The apparatus of claim 6, the operations further comprising:

responsive to the sending of the third request message, storing, by the second network structure, state data describing the third request message; and responsive to the sending of the first reply message, clearing the state data describing the third request message.

8. The apparatus of claim 4, the operations further comprising selecting the second hardware compute element by the second hardware balancer element.

9. The apparatus of claim 1, wherein the sending of the first request message is via a first network structure, the operations further comprising:

responsive to the sending of the first request message, storing, by the first network structure, state data describing the first request message; and responsive to the sending of the first reply message, clearing the state data describing the first request message by the first network structure.

10. A method, comprising:

sending, by a first hardware compute element, a first request message to a hardware balancer element, the first request message describing a processing task;

sending, by the hardware balancer element, a second request message towards a second hardware compute element for executing the processing task, the second request message also describing the processing task;

sending, by the hardware balancer element and to the first hardware compute element, a first reply message, the first reply message being in reply to the first request message;

after sending the first reply message, receiving, by the hardware balancer element, a first completion request message, the first completion request message indicating that the processing task is assigned; and sending, by the hardware balancer element and to the first hardware compute element, a second completion request message, the second completion request message indicating that the processing task is assigned.

11. The method of claim 10, the method further comprising selecting the second hardware compute element by the hardware balancer element.

12. The method of claim 11, wherein sending the second request message towards the second hardware compute element comprises directing the second request message to the second hardware compute element.

13. The method of claim 10, wherein sending the second request message towards the second hardware compute element comprises sending the second request message to a second hardware balancer element, and wherein the first completion request message is received from the second hardware compute element.

14. The method of claim 13, further comprising sending, by the hardware balancer element, a first completion reply message to the second hardware balancer element.

15. The method of claim 13, wherein the sending of the first request message is via a first network structure, the method further comprising:

sending, by the second hardware balancer element and to the second hardware compute element, a third request message describing the processing task, the third request message being sent via a second network structure different than the first network structure; and sending, by the second hardware compute element and to the second hardware balancer element, a second reply message in reply to the third request message, the second reply message indicating that the processing task is assigned.

16. The method of claim 15, further comprising:

responsive to the sending of the third request message, storing, by the second network structure, state data describing the third request message; and responsive to the sending of the first reply message, clearing the state data describing the third request message.

17. The method of claim 13, further comprising selecting the second hardware compute element by the second hardware balancer element.

18. The method of claim 10, wherein the sending of the first request message is via a first network structure, the method further comprising:

responsive to the sending of the first request message, storing, by the first network structure, state data describing the first request message; and responsive to the sending of the first reply message, clearing the state data describing the first request message by the first network structure.

19. At least one non-transitory computer readable medium comprising instructions thereon that, when executed by at least one hardware component, cause the at least one hardware component to perform operations comprising:
  sending, by a first hardware compute element, a first request message to a hardware balancer element, the first request message describing a processing task;
  sending, by the hardware balancer element, a second request message towards a second hardware compute element for executing the processing task, the second request message also describing the processing task;
  sending, by the hardware balancer element and to the first hardware compute element, a first reply message, the first reply message being in reply to the first request message;
  after sending the first reply message, receiving, by the hardware balancer element, a first completion request message, the first completion request message indicating that the processing task is assigned; and
  sending, by the hardware balancer element and to the first hardware compute element, a second completion request message, the second completion request message indicating that the processing task is assigned.

20. The medium of claim 19, the operations further comprising selecting the second hardware compute element by the hardware balancer element.

* * * * *